(12) United States Patent
Kinder et al.

(10) Patent No.: US 11,949,787 B2
(45) Date of Patent: Apr. 2, 2024

(54) SYSTEMS AND METHODS FOR LINKING AN AUTHENTICATION ACCOUNT TO A DEVICE

(71) Applicant: Nametag Inc., Seattle, WA (US)

(72) Inventors: Ross Rowland Kinder, Ann Arbor, MI (US); David Christopher Adrian, Denver, CO (US); Andrew Justin Caird, Ann Arbor, MI (US)

(73) Assignee: Nametag Inc., Seattle, WA (US)

( * ) Notice: Subject to any disclaimer, the term of this patent is extended or adjusted under 35 U.S.C. 154(b) by 0 days.

(21) Appl. No.: 18/101,978

(22) Filed: Jan. 26, 2023

(65) Prior Publication Data

US 2024/0056298 A1 Feb. 15, 2024

Related U.S. Application Data

(60) Provisional application No. 63/397,316, filed on Aug. 11, 2022.

(51) Int. Cl.
| | |
|---|---|
| *H04L 9/30* | (2006.01) |
| *G06K 7/10* | (2006.01) |
| *G06K 7/14* | (2006.01) |
| *H04L 9/08* | (2006.01) |
| *H04L 9/40* | (2022.01) |

(52) U.S. Cl.
CPC ............ *H04L 9/30* (2013.01); *G06K 7/10722* (2013.01); *G06K 7/1417* (2013.01); *H04L 9/088* (2013.01); *H04L 63/0861* (2013.01)

(58) Field of Classification Search
CPC ....... H04L 9/30; H04L 9/088; H04L 63/0861; G06K 7/10722; G06K 7/1417
See application file for complete search history.

(56) References Cited

U.S. PATENT DOCUMENTS

| | | | |
|---|---|---|---|
| 5,499,294 | A | 3/1996 | Friedman |
| 10,467,398 | B1 | 11/2019 | Derakhshani et al. |
| 11,657,132 | B2 * | 5/2023 | Tussy ................. G06Q 20/3276 726/6 |
| 2006/0161788 | A1 | 7/2006 | Turpin et al. |
| 2015/0095352 | A1 | 4/2015 | Lacey |
| 2017/0255942 | A1 | 9/2017 | Chandrasekaran et al. |
| 2017/0289120 | A1 * | 10/2017 | Kohli ...................... H04L 63/08 |

(Continued)

*Primary Examiner* — Yonas A Bayou
(74) *Attorney, Agent, or Firm* — Foley & Lardner LLP

(57) ABSTRACT

Systems and methods for linking an authentication account to a device may include processor(s) to maintain a plurality of authentication profiles, each authentication profile corresponding to a respective user and including at least one profile image, an immutable identifier, and authentication data used to authenticate the respective user. The processor(s) may receive a request including the device key, an immutable identifier, and a biometric image captured by a camera of a client device. The processor(s) may identify a subset of authentication profiles having respective immutable identifiers that match the immutable identifier from the request. The processor(s) may compare feature(s) extracted from the biometric image of the request to features extracted from the a profile image of the subset of authentication profiles, and link the device key of the client device with an authentication profile in a data structure to register the client device with the authentication server.

20 Claims, 13 Drawing Sheets

(56) References Cited

U.S. PATENT DOCUMENTS

| | | | |
|---|---|---|---|
| 2019/0272361 A1* | 9/2019 | Kursun | H04L 67/535 |
| 2020/0068399 A1* | 2/2020 | Brown | H04L 9/3236 |
| 2022/0147604 A1 | 5/2022 | Ozono et al. | |
| 2022/0255741 A1* | 8/2022 | Law | H04L 9/30 |

\* cited by examiner

SYSTEMS AND METHODS FOR LINKING AN AUTHENTICATION ACCOUNT TO A DEVICE

CROSS-REFERENCE TO RELATED PATENT APPLICATIONS

This application claims the benefit of and priority to U.S. Provisional Application No. 63/397,316, filed Aug. 11, 2022, the contents of which are incorporated herein by reference in its entirety.

INTRODUCTION

This application is generally directed to authentication including systems and methods for third-party authentication services.

Users may access various resources on a client or client device. Some resources may be protected such that, for a user to obtain access to the resource, the user may be authenticated. Such implementations may ensure the security of such resources by limiting or prohibiting unintended access or leakage.

SUMMARY

At least one aspect of the present disclosure is directed to a method. The method may include maintaining, by an authentication server, a plurality of authentication profiles, each authentication profile corresponding to a respective user and including at least one profile image, a date of birth, and authentication data used to authenticate the respective user. The method may include establishing, by the authentication server, a session with an authentication service executing on a client device of a user. The method may include receiving, by the authentication server from the client device via the session with the authentication service, a request including the device key (e.g., a public key) of the client device, a date of birth of the first user, and a biometric image captured using a camera of the client device controlled via the authentication service. The method may include identifying, by the authentication server, from the plurality of authentication profiles, a subset of authentication profiles having respective dates of birth that match the date of birth from the request. The method may include comparing, by the authentication server, one or more features extracted from the biometric image of the request to features extracted from the at least one profile image of the subset of authentication profiles. The method may include linking, by the authentication server in a data structure, responsive to determining that the one or more features from the biometric image match the features extracted from the at least one profile image of the authentication profile, the device key of the client device with an authentication profile of the subset of authentication profiles to register the client device with the authentication server.

In some embodiments, the request includes an image of an identification document (ID) and the method includes extracting, by the authentication server, the date of birth and a second image of a face of the user from the ID. The method may include comparing, by the authentication server, the biometric image with the second image from the ID. In some embodiments, the method includes authenticating, by the authentication server, the user based on a comparison of one or more first features extracted from the biometric image and one or more second features extracted from the second image. In some embodiments, the method includes determining, by the authentication server, to identify the first subset of authentication profiles based on determining that the device key does not match a known device key stored in the data structure. In some embodiments, the method includes authenticating the biometric image as captured by the camera of the client device based on a cryptographic assertion received from the client device.

In some embodiments, the method includes identifying, by the authentication server, the authentication profile based on matching the one or more features from the biometric image to the one or more features extracted from the at least one profile image of the authentication profile. The method may include transmitting, by the authentication server to the client device, a second request to merge the device key for the client with the authentication profile. In some embodiments, linking the device key of the client device with the authentication profile is based on a response to the second request. In some embodiments, the client device includes a second client device of the user and the biometric image is a second biometric image and the method includes receiving, by the authentication server, from a first client device of the user, a first device key of the first client device and the authentication data included in a new profile request. The method may include receiving, by the authentication server from the first client device, a first biometric image captured by the first client of the user. The method may include storing, by the authentication server in the data structure, the first biometric image and the first device key in association with the authentication profile. In some embodiments, the second biometric image from the request is matched to the first image received from the first client device. In some embodiments, the method includes receiving, by the authentication server from the authentication service of the client device responsive to linking the device key to the authentication profile, a second request to authenticate the user of the client device to a resource server, the second request including a second biometric image. The method may include authenticating, by the authentication server to the resource server, the user of the client device based on the second biometric image.

At least one aspect of the present disclosure is directed to an authentication system. The authentication system may include one or more authentication servers. The one or more authentication servers may be configured to maintain a plurality of authentication profiles, each authentication profile corresponding to a respective user and including at least one profile image, a date of birth, and authentication data used to authenticate the respective user. The one or more authentication servers may be configured to establish a session with an authentication service executing on a client device of a user. The one or more authentication servers may be configured to receive, from the client device via the session with the authentication service, a request including the device key of the client device, a date of birth of the first user, and a biometric image captured using a camera of the client device controlled via the authentication service. The one or more authentication servers may be configured to identify, from the plurality of authentication profiles, a subset of authentication profiles having respective dates of birth that match the date of birth from the request. The one or more authentication servers may be configured to compare one or more features extracted from the biometric image of the request to features extracted from the at least one profile image of the subset of authentication profiles. The one or more authentication servers may be configured to link, in a data structure, responsive to determining that the one or more features from the biometric image match the features extracted from the at least one profile image of the authentication profile, the device key of the client device with an authentication profile of the subset of authentication profiles to register the client device with the authentication server.

In some embodiments, the request includes an image of an identification document (ID) and the one or more authentication servers are configured to extract the date of birth and a second image of a face of the user from the ID. The one or more authentication servers may be configured to compare the biometric image with the second image from the ID. In some embodiments, the one or more authentication servers are configured to authenticate the user based on a comparison of one or more first features extracted from the biometric image and one or more second features extracted from the second image. In some embodiments, the one or more authentication servers are configured to determine to identify the first subset of authentication profiles based on determining that the device key does not match a known device key stored in the data structure.

In some embodiments, the one or more authentication servers are configured to authenticate the biometric image as captured by the camera of the client device based on a cryptographic assertion received from the client device. In some embodiments, the one or more authentication servers are configured to identify the authentication profile based on matching the one or more features from the biometric image to the one or more features extracted from at least one profile image of the authentication profile. The one or more authentication servers may be configured to transmit, to the client device, a second request to merge the device key for the client with the authentication profile. Linking the device key of the client device with the authentication profile may be based on a response to the second request. In some embodiments, the client device includes a second client device of the user and the biometric image is a second biometric image and the one or more authentication servers are configured to receive, from a first instance of the authentication service executing on first client device of the user, a first device key of the first client device and the authentication data included in a new profile request. The one or more authentication servers may be configured to receive, from the first client device, a first biometric image captured using a camera of the first client device controlled via the authentication service. The one or more authentication servers may be configured to store, in the data structure, the first biometric image and the first device key in association with the authentication profile. In some embodiments, the second biometric image from the request is matched to the first image received from the first client device. In some embodiments, the request is a request to authenticate to a resource server and the one or more authentication servers are configured to authenticate, to the resource server, the user of the client device based on the first biometric image and a second image extracted from an identification document captured by the client device.

At least one aspect of the present disclosure is directed to a non-transitory computer readable medium storing instructions that, when executed by one or more processors of an authentication server, may cause the one or more processors to maintain a plurality of authentication profiles, each authentication profile corresponding to a respective user and including at least one profile image, a date of birth, and authentication data used to authenticate the respective user. The instructions may cause the one or more processors to establish a session with an authentication service executing on a client device of a user. The instructions may cause the one or more processors to receive, from the client device via the session with the authentication service, a request including the device key of the client device, a date of birth of the first user, and a biometric image captured using a camera of the client device controlled via the authentication service. The instructions may cause the one or more processors to identify, from the plurality of authentication profiles, a subset of authentication profiles having respective dates of birth that match the date of birth from the request. The instructions may cause the one or more processors to compare one or more features extracted from the biometric image of the request to features extracted from the at least one profile image of the subset of authentication profiles. The instructions may cause the one or more processors to link, in a data structure, responsive to determining that the one or more features from the biometric image match the features extracted from the at least one profile image of the authentication profile, the device key of the client device with an authentication profile of the subset of authentication profiles to register the client device with the authentication server.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
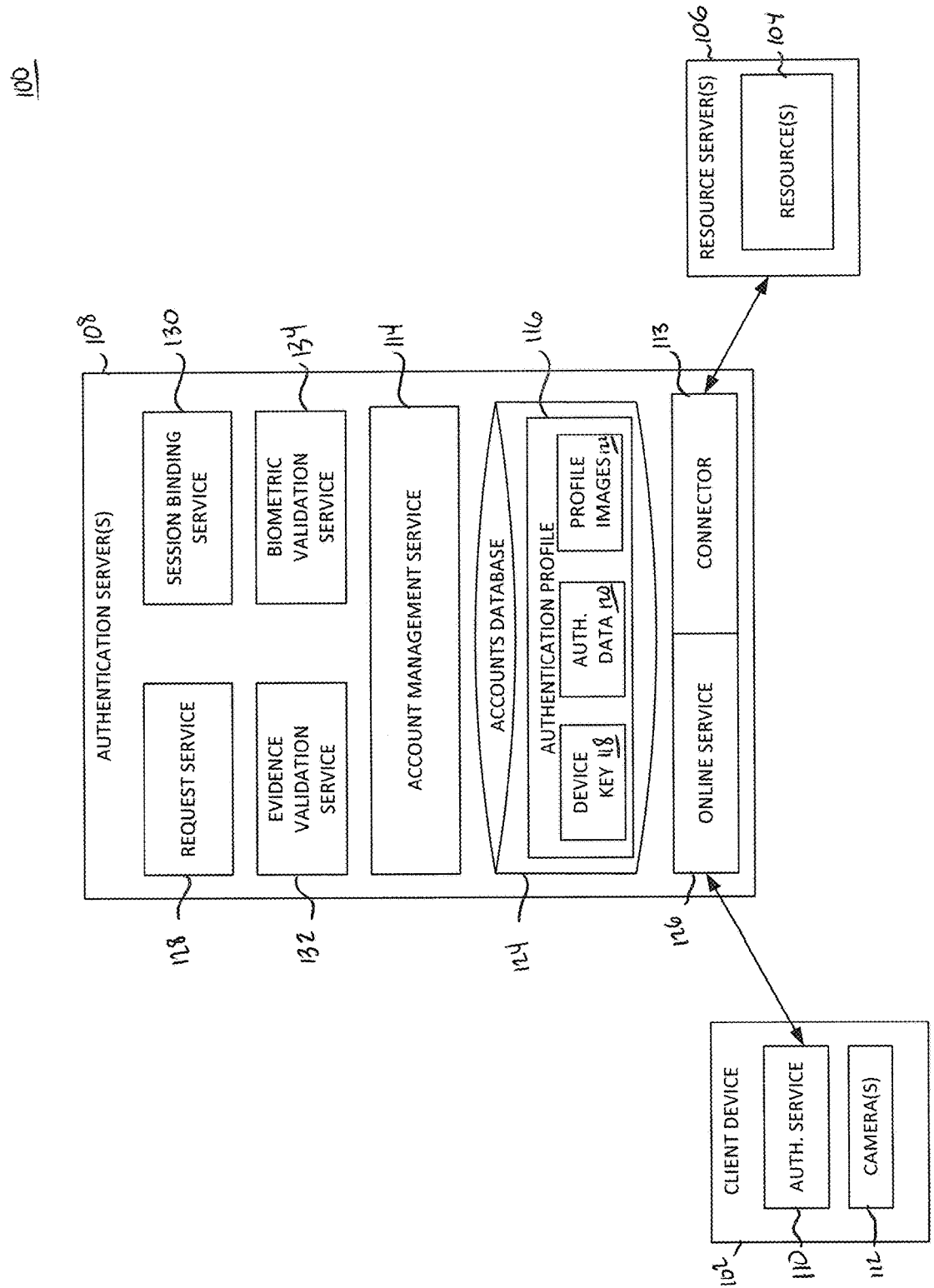
FIG. 1 is a block diagram of a system for authentication, according to an example implementation of the present disclosure.

Following below are more detailed descriptions of various concepts related to, and implementations of, methods, apparatuses, and systems of FIG. 1-FIG. 12. The various concepts introduced above and discussed in greater detail below may be implemented in any of numerous ways.

Existing authentication services often rely on credentials supplied by a user of a device for access rights to a given resource. However, if a user's credentials are intercepted or otherwise identified by a third-party (e.g., by credential interception by a spoofing third-party, by the user sharing their credentials with a third-party, etc.), the trust between the resource and user is broken. Some authentication services may rely on dual or multi-factor authentication. However, often times, to the extent that a user's credentials have been compromised for accessing the resource, the user's credentials needed for supporting the additional factors for authentication may also be compromised.

According to the systems and methods described herein, an authentication server may maintain an authentication profile for each user, which is bound to a device of the user. In particular, the user may generate the authentication profile using an authentication service executing on the device. The authentication service may leverage an encryption protocol or service of the device, for generating a device key which is unique to the device. The authentication service may provide the device key to the authentication server for storage together with the authentication profile for the user, thus binding the device to the authentication profile (e.g., based on the device key from the device matching the device key stored in the authentication profile). Such implementations and embodiments may be impervious to credential sharing or interception, since the device key is persistent and unique to a particular device.

Where authentication includes a comparison of a biometric image to a known user image (such as in facial recognition systems), the biometric image may originate from any source outside of a device. For example, a third-party may intercept or otherwise use an image of a user, in an attempt to impersonate the user for authenticating to a resource. The third-party may upload the image, capture an image of the image, etc. According to the systems and methods described herein, the authentication service may control a hardware camera of the device for capturing biometric images of users attempting to authenticate. The authentication service may digitally sign or otherwise attest to the biometric image as captured by the hardware camera. When the authentication server receives a biometric image, the authentication server may check for the digital signature of the authentication service, thus confirming that the image is not originating from a third-party. Further, the authentication server may use additional data (such as depth map data appended to the image by the camera or authentication service) to confirm that the image is not an image of an image itself, and is rather a live image. Such implementations and embodiments may prevent image swapping for authentication purposes, by ensuring that the biometric images used for authentication purposes are captured in real-time (e.g., during the session between the authentication server and authentication service) and are biometric images of live users (and not an image of an image).

Additional improvements over other authentication services are described in greater detail below.

For purposes of reading the description of the various embodiments below, the following descriptions of the sections of the specification and their respective contents may be helpful:

Section 1. Systems and Methods for Account Authentication.
  Section 2. Systems and Methods for Account Recovery.
  Section 3. Systems and Methods for User Verification.
  Section 4. Machine Learning and Artificial Intelligence Systems.
  Section 5. Computer Architecture.

1. Systems and Methods for Account Authentication

Referring to FIG. 1, depicted is a block diagram of a system 100, which can be used for authentication. In general, a user operating a client device 102 may attempt to access a resource 104 hosted on a resource server 106. As part of resource access rights, the resource server 106 may request the user authenticate with the resource 104 prior to the user being permitted access to the resource 104. In various implementations, users may authenticate with a resource 104 through various authentication mechanisms, such as a username and password, a one-time pass code, through voice, text message, email authentication, dual-factor or multi-factor authentication, or any other authentication method or combination of authentication methods. However, some of such authentication mechanisms may be cumbersome on users, may have security risks associated therewith, and may not provide a level of authenticity that is satisfactory for access rights to a given resource. Additionally, because identities and personally identifiable information (PII) of a user can change over time (e.g., through name change, email address changes, aging or face augmentation, and so forth), such systems may not have persistence.

According to the embodiments described herein, the system 100 may include one or more authentication server(s) 108, which operate with an authentication service 110 executing on the client device 102. Together, the authentication server(s) 108 and/or authentication service 110 may be configured to share validated authentication information and identity assurance about user(s) of the client device 102 with the resource server(s) 106 upon receipt of the user's consent. In particular, and as described in greater detail below in Section 1(A), the authentication service 110 may be configured to receive, capture, or otherwise obtain authentication information or data used to authenticate users of the client device 102 (e.g., via the camera(s) 112 of the client device 102). As described in greater detail below in Section 1(C), the authentication server(s) 108 may be configured to validate or verify the authentication data provided by the authentication service 110.

The authentication server(s) 108 may include one or more connectors 113 and/or embeddable components or authentication protocol implementations configured to connect the authentication server(s) 108 to the resource server(s) 106. To provide authentication of users, the authentication service 110 may be configured to determine information requested by the resource server(s) 106 (e.g., by the resource 104) from the user for validation. The authentication service 110 may be configured to collect, obtain, or otherwise receive the data packets or requests including authentication data (also referred to as evidence) from the user, and provide the received evidence to the authentication server 108. As described in Section 1(C), the authentication server 108 may be configured to validate the authentication data received from the user via the authentication service 110. The authentication server(s) 108 may be configured to track consent of the user to share the validated information with the resource 104. The authentication server(s) 108 may be configured to transmit, send, or otherwise provide the validated information with the resource 104 responsive to receiving or otherwise determining that the user consents to sharing the validated information.

A. Initiating A Request

Figure 2:
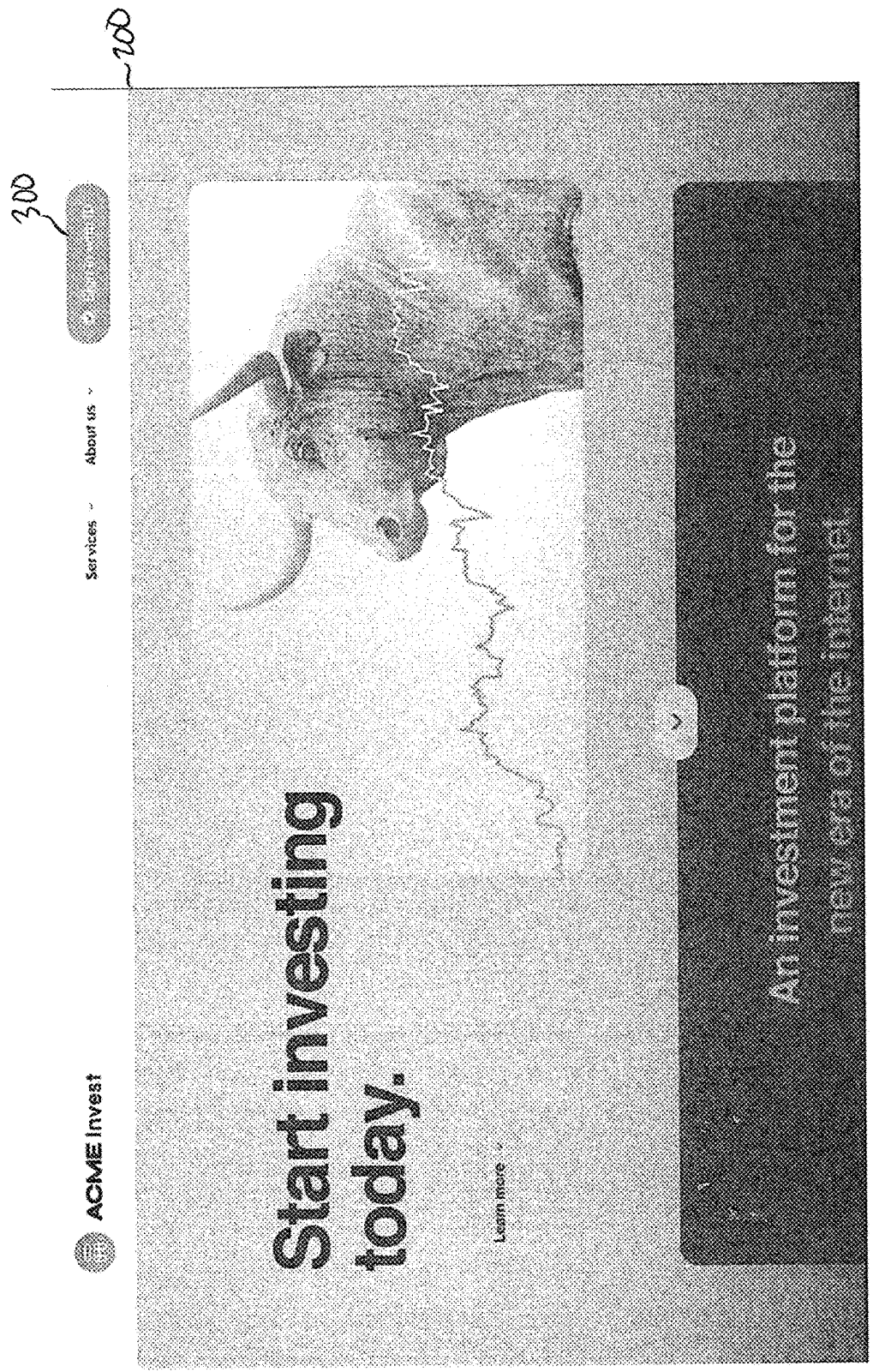
FIG. 2 is a view of a user interface of a resource hosted on a resource server, according to an example implementation of the present disclosure.

Referring now to FIG. 1 and FIG. 2, a user of the client device 102 may navigate to a webpage corresponding to a resource 104 hosted on the resource server 106. Specifically, FIG. 2 shows a user interface 200 of a resource, according to an example implementation of the present disclosure. The resource 104 may be or include any resource 104, including but not limited to websites, webpages, applications, or any other internet-based resource. The resource 104 may be a protected resource such that, to obtain access to one or more functionalities, features, or pages of the resource 104, the resource 104 may request that the user provide authentication information to authenticate to the resource 104.

To obtain access to the resource 104, the resource 104 may generate, create, or otherwise establish a session between the client device 102 and the resource server 106. The resource server 106 may be configured to issue a request to the client device 102 to authenticate via the authentication server 108. The resource server 106 may be configured to issue the request using a library provided by the authentication server(s) 108, by a third-party authentication library (such as OAuth 2.0), or some other library. The resource server 106 may be configured to bind the request to the session established between the client device 102 and server 108 (e.g., by incorporating a session identifier in a request to the authentication service for the user to authenticate themselves), which ensures that the user proving their identity is the same as the user that initiated the transaction with the resource server.

Resource server(s) 106 may typically expect identity or authentication services to comply with existing authentication protocols, such as OAuth 2.0, SAML, Webauthn, RADIUS, Kerberos, and/or other authentication protocols. These protocols typically define the relationships and interconnection between three parties: the relying party (the resource), the subject (the user trying to sign in to access the resource) and the identity provider (e.g. authentication server 108 and authentication service 110). There are many such protocols, and each impose standards about the authentication flows that may not apply to the authentication service. For example, most protocols may require that the underlying mechanism for identifying a user is based on a password. Also, most protocols may assume that the entire flow will occur on the same device, and rely on this assumption for their security. Because the systems and methods described herein work to facilitate authentication across two or more devices, the systems and methods described herein may be adapted to bind the initiating device to a particular session, such that the standards for authentication defined by such protocols are met. For example, the systems and methods described herein may implement the session token to bind the result back to the initiating device where authentication occurs across devices. Additionally, the systems and methods described herein may provide a user interface element, such as a quick response code, to allow users to easily bind a desktop browser session to a mobile client device.

Figure 3:
FIG. 3 is a view of a user interface element for initiating authentication on the user interface of FIG. 2, according to an example implementation of the present disclosure.
Figure 4:
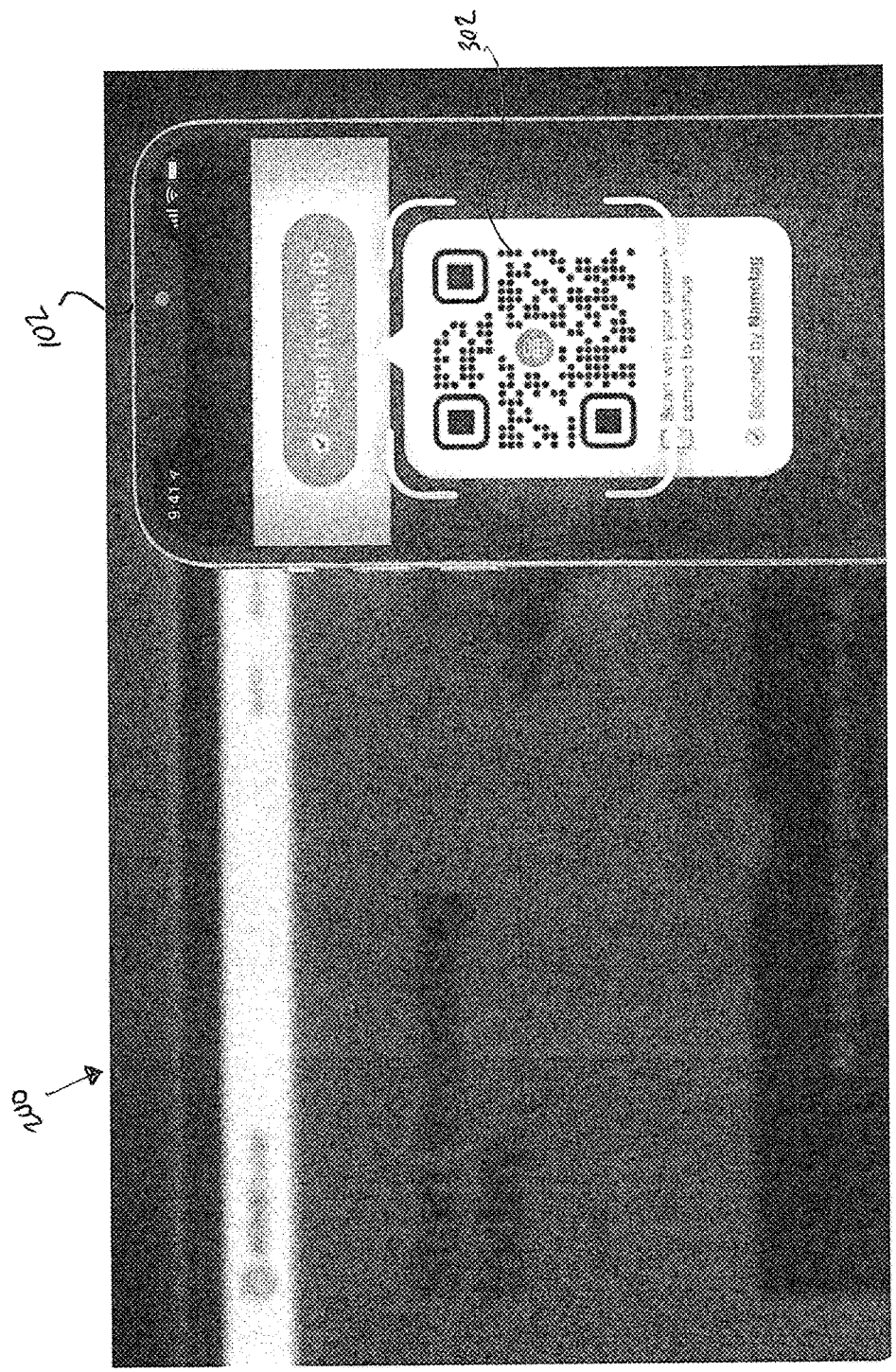
FIG. 4 is a view of a client device interfacing with the user interface element of FIG. 3, according to an example implementation of the present disclosure.

As shown in FIG. 3, to initiate the request, resource 104 may be configured to direct the user to a uniform resource locator (URL) corresponding to the request (e.g., a request URL). The resource 104 may direct the user to the URL by displaying a quick response code which is encoded to direct the client device to the URL (or automatically launch the URL) upon scanning the quick response code. Specifically, FIG. 3 shows a view of a user interface element 300 for initiating authentication on the user interface 200, according to an example implementation of the present disclosure. As shown in FIG. 3, the resource 104 may include a user interface element 300, which may be or include button or toggle, which launches display of a quick response (QR) code 302. In some embodiments, the user may be directed to the request URL through or by way of a text message, a near-field communication NFC tag, a hyperlink, or some other manner of directly or indirectly launching the request URL on the client device. As shown in FIG. 4, where the QR code 302 is displayed, the user of the client device 102 may be configured to scan (e.g., using the camera(s) 112) the QR code 302 shown on the user interface 200. Upon the user operating a camera 112 of the device 102 to scan the QR code 302, the client device 102 may be directed to the request URL, which is encoded in or otherwise associated with the QR code 302.

Figure 5:
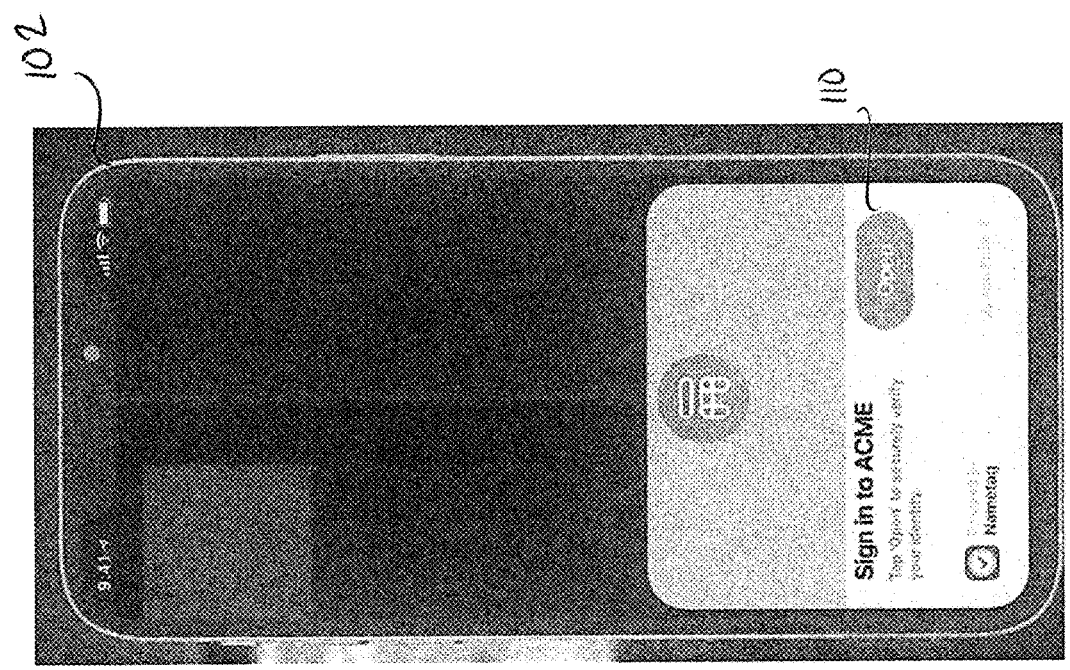
FIG. 5 is a view of a user interface of the client device of FIG. 4, according to an example implementation of the present disclosure.

As shown in FIG. 5, when the client device 102 is directed to the request URL, the authentication service 110 may be configured to launch on the client device 102. The authentication service 110 may be or include an application deployed or otherwise installed on the client device 102, an over-the-air (OTA) installed version of the application (e.g., a miniature version of the application, such as an APPLE App Clip, an ANDROID Instant App, etc.), and the like. For example, where a native application version of the authentication service 110 is not installed on the client device 102, when a user of the client device 102 launches the request URL (e.g., by scanning the QR code), a server receiving a domain name service (DNS) request for the request URL may re-direct the user to launch the OTA-installed version of the application. The authentication service 110 may be deployed on the client device 102 while the initial URL that represents the request (e.g., between the client device 102 and resource server 106) is preserved.

Figure 9:
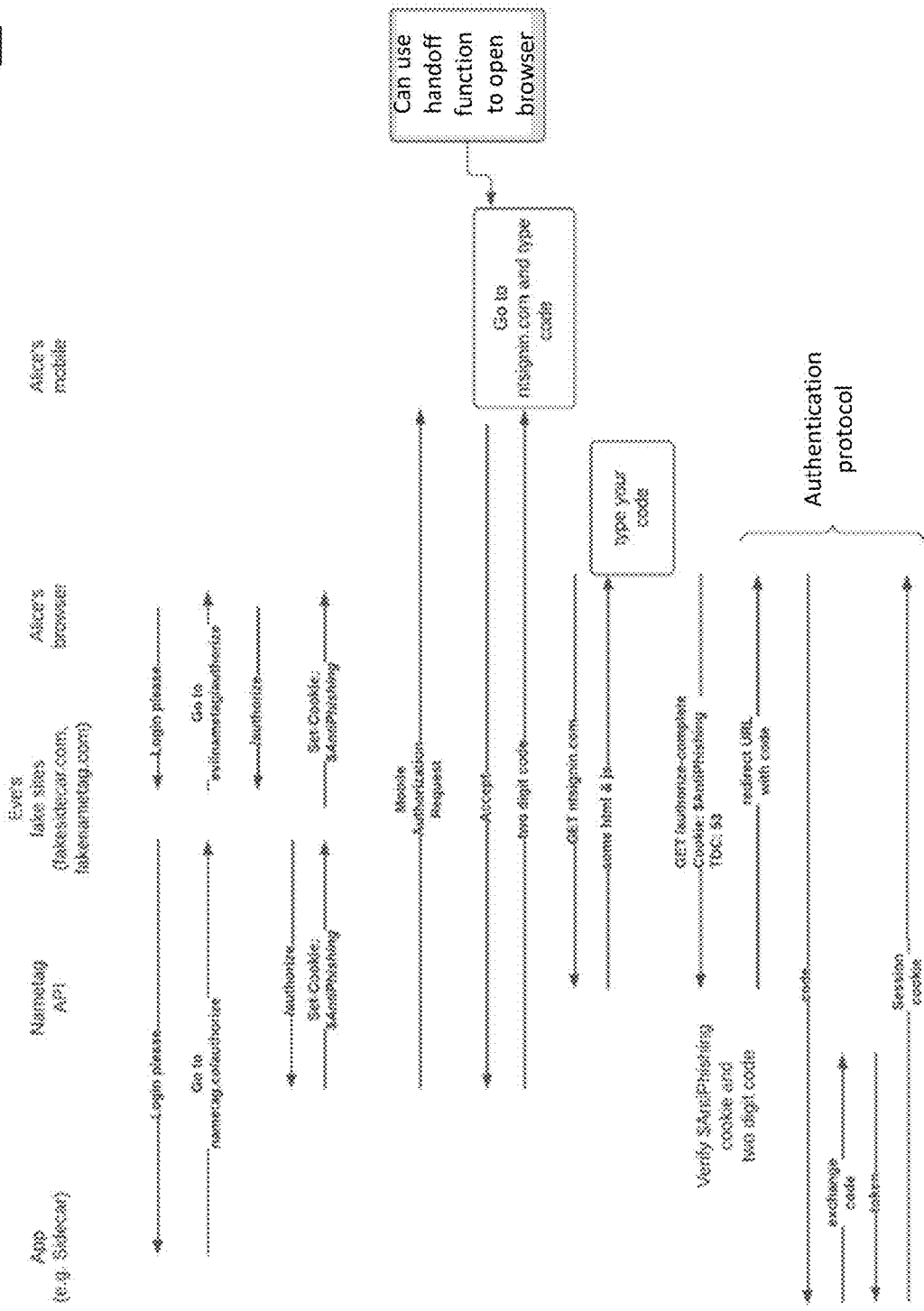
FIG. 9 is view of a process flow showing a method for session binding, according to an example implementation of the present disclosure.

In some embodiments, and as shown in the process flow 900 of FIG. 9, where the request URL is launched via a desktop (or laptop) web browser, the authentication service 110 and/or authentication server 108 may be configured to issue a session token to the browser which is associated with the session established between the client device 102 and resource server 106. As shown in FIG. 9, the session token may be used to ensure that the browser that initiated the request to access the resource is the same browser that completed the request (e.g. a user of both client devices is the same). Without this token, an attacker could intercept the completed request and masquerade as the user. When the request URL is launched from a text message, quick response (QR) code, or near-field communication (NFC) tag, a session token may not be provided. When the session token is provided, the session token may be set for the session as a cookie on the user's browser (e.g., of the user's computing device). The user may then be directed, e.g., during authentication, to access their known mobile device to type a code to page accessed via a URL—both of which may be provided by the authentication page for the browser of the user's computing device during authentication. When the code is successfully typed at the correct URL, the authentication server 108 may authenticate the session and verify/update a status of the session cookie to indicate that the computing device corresponds to the known mobile device. It is noted that, in some implementations, the redirection to the mobile device may only be performed where authentication is attempted at an unknown device (e.g., the computing device has not been used before by the user to authenticate via the authentication server 108).

Some web-based sign-in flows may occupy an entire browser window, and result in a user navigating away from the resource 104 webpage to effect the sign in flow. The resource 104 or resource host may not, however, want the user to navigate away from the webpage. According to some of the systems and methods of the present solution, because the authentication flow happens off-device for desktop (or laptop) sign ins, there is no need for the user to navigate away from the resource 104. Instead, the resource server 106 (or host) can embed the user interface element 300 into the user interface 200, which displays a "Sign in with ID" button. When pressed, the user interface 200 may display or otherwise include the QR code 302 to initiate the request. Since the session between the client device 102 and resource server 106 is bound to the request, the authentication service 110 may be configured to monitor the status of the request, and upon completion, pass the completion URL back to the resource server 106, all within the embedded widget. This provides a smoother, more efficient sign in process than other systems and methods for authentication.

B. Processing the Request

Upon initial launch, the authentication service 110 may be configured to use cryptographic hardware or components of the client device 102 to establish a cryptographic public/private key pair. The public-private key or key pair may uniquely identify or otherwise be associated with the client device 102 ("device key"). This key pair is configured to be unexportable, meaning it is bound to or otherwise uniquely associated with the particular client device 102. The authentication service 110 executing on the client device 102 may be configured to transmit, send, or otherwise provide the device key (e.g., the public key of the key pair) to the authentication server 108. An account management service 114 of the authentication service 110 may be configured to receive the device key from the authentication service 110 as part of generating an authentication profile 116 for the user of the client device 102. As described in greater detail below, the account management service 114 may be configured to store the device key 118 in association with authentication data 120 and one or more profile images 122 for the authentication profile 116 in an accounts database 124 or some other data structure maintained or accessible by the authentication server 108.

The authentication service 110 may be configured to inform, indicate, instruct, or otherwise identify (e.g., to an online service 126 of the authentication server 108) that the authentication service 110 is performing, handling, or otherwise initiating providing authentication that corresponds to the request URL (e.g., specified or indicated by the QR code 302). The online service 126 may indicate, e.g. to a request service 128, that the authentication service 110 on the client device 102 is being used to authenticate the user for the request URL. The request service 128 may maintain the session identifiers associated with each request URL. The session binding service 130 may be configured to bind the request URL to the device key of the client device 102, which is executing the authentication service 110, thus ensuring that only one device can handle a request.

An evidence validation service 132 may be configured to determine the evidence needed for satisfying the authentication request to the resource server 106. Evidence, as used herein, refers to information, data, or the like which is supplied by a user in support of authentication. Evidence may include information which is used for comparison to authentication data 120 stored in the authentication profile 116 for the user. For example, evidence may include biometric images which are compared to profile images 122, a date of birth or address which are compared to the date of birth or address from the authentication profile 116, etc. The evidence validation service 132 may be configured to determine the evidence needed for satisfying the request based on data from the request URL. For example, the request URL may include or identify particular types of data needed for authenticating the user. Additionally or alternatively, the evidence validation service 132 may be configured to determine the evidence needed for satisfying the request by requesting such information from the resource (e.g., through one or more application program interface (API) calls). Additionally or alternatively, the evidence validation service 132 may be configured to determine the evidence needed for satisfying the request by accessing stored information maintained for a number of different resources (including the resource 104). The evidence validation service 132 may be configured to determine current or existing authentication data 120 stored in the authentication profile 116 and provided by the user. For example, the authentication data 120 may be indexed according to a type or category of authentication data 120, along with flags indicating whether each entry of the authentication data 120 has been validated. The evidence validation service 132 may be configured to determine, based on the specific information provided and stored in the authentication profile 116, if the individual has already provided enough evidence to satisfy the request, and if that evidence has been validated.

The evidence validation service 132 may be configured to determine which types of evidence are to be used in satisfaction of the request. To determine which types of evidence are to be used, the evidence validation service 132 may be configured to maintain a plurality of rules and tags associated with corresponding evidence maintained or obtainable for the user. For example, if the resource 104 (or resource server 106) requests a validated profile picture for acceptable authentication, the user should provide a driver license or passport or some other identity or identification document (ID), but could also provide a profile photo. However, where an ID is provided but not a separate profile photo, evidence validation service 132 may be configured to extract the profile photograph from the ID. Additionally or alternatively, if a separate profile photo is provided, the evidence validation service 132 can be configured to confirm that the profile photo contains exactly one face and that face should match the face on the ID. The evidence validation service 132 may be configured to instruct the authentication service 110 which evidence has been provided, which is needed to complete the request, and if the request can yet be satisfied.

Figure 7:
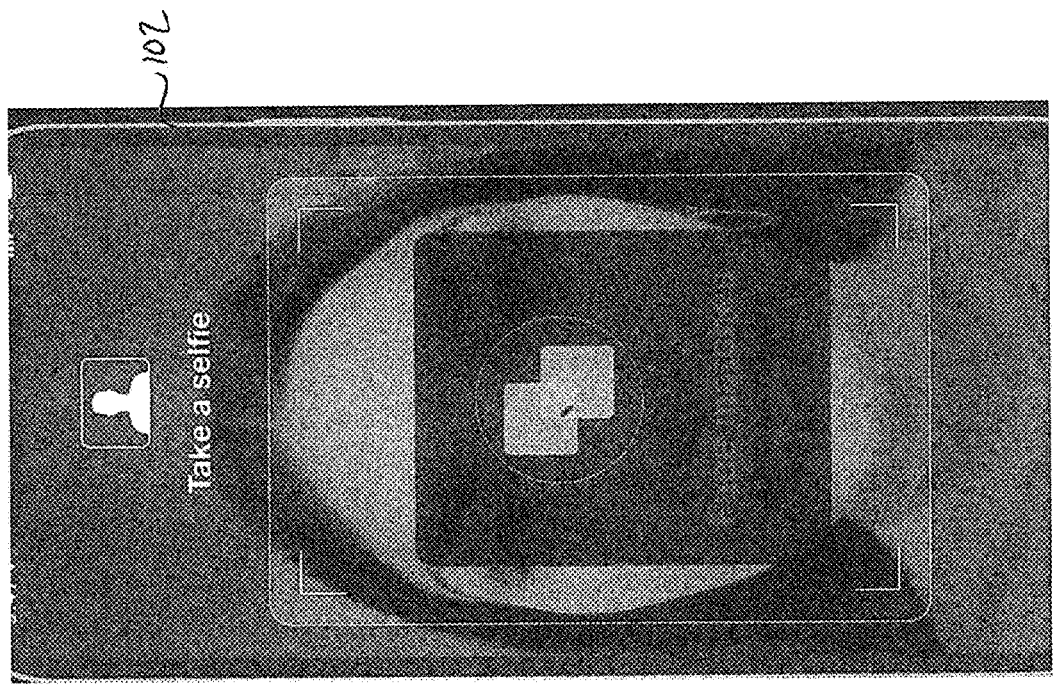
FIG. 7 is a view of a user interface of the client device of FIG. 4 for capturing a biometric image of a user, according to an example implementation of the present disclosure.
Figure 6:
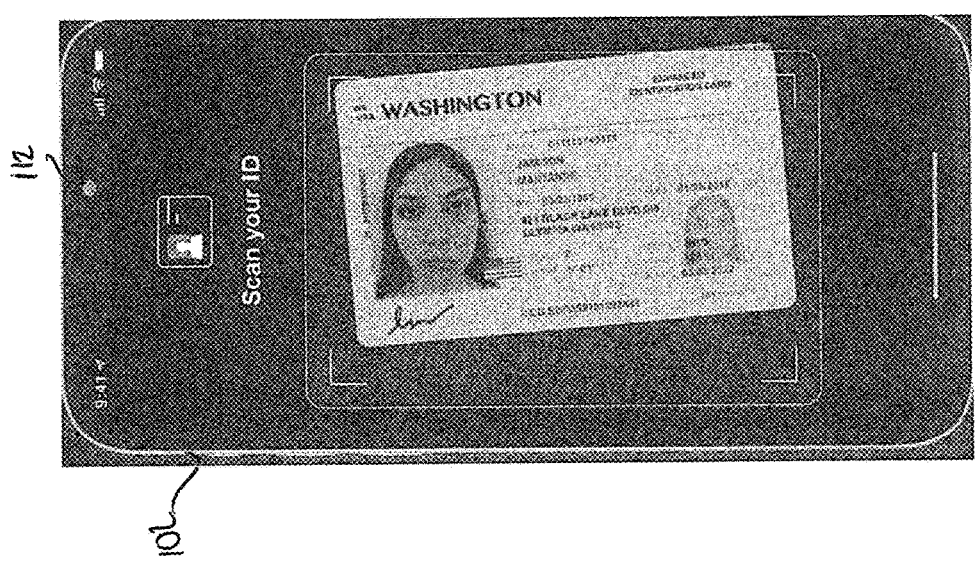
FIG. 6 is a view of a user interface of the client device of FIG. 4 for scanning an identification document (ID) of a user, according to an example implementation of the present disclosure.

As shown in FIG. 6 and FIG. 7, to collect evidence, the authentication service 110 may be configured to activate the camera(s) 112 of the client device 102 to obtain, capture, or otherwise receive the evidence. In some embodiments, the client device 102 provides video frames to the authentication service 110. For each video frame, the authentication service 110 may be configured to apply one or more computer vision tools to determine if the image is likely to be an acceptable form of the desired evidence, and that the image is of sufficient quality. The authentication service 110 may be configured to perform an initial (or first) analysis on each of the video frames captured by the device camera to determine the quality of each frame. The initial or first analysis may be or include high-performance but slightly lower fidelity analysis. If the authentication service 110 determines that the image is likely to be accepted, and of high enough quality, then the frame can be captured and passed to the authentication service 110 for a second (or subsequent) analysis for validation. For example, to determine if a video frame contains a valid image of the back of a North American driver license, the authentication service 110 may be configured to check, verify, or otherwise determine that the PDF-417 barcode is present on the back of driver's license. The authentication service 110 may be configured to use object detection to determine the dimensions of the primary object in the image, and ensures that the object's bounding box is sufficiently far from each edge of the frame, to ensure that the card is fully within the frame. The authentication service 110 may be configured to use machine vision tools, such as Laplacian operator(s) or other functions, to verify the image as sufficiently clear, brightness, etc. within a specified acceptable range.

In some embodiments, the authentication service 110 may be configured to determine a type of evidence based on video frames captured via the camera(s) 112 of the client device 102. For example, prior to video capture, the authentication service 110 may be configured to receive, from the authentication server 108, a list of keywords associated with each type of evidence or credential document. The list of keywords may include, for example, "driver," "license," "vehicle," "automobile," "passport," "operator," and the like. Each keyword may include a flag or identifier indicating that the credential document has two sides to be imaged or a single side to be imaged. As part of the initial or subsequent analysis by the authentication service 110, the authentication service 110 may be configured to apply or perform an optical character recognition (OCR) to identify characters in the credential document captured in the video frame(s).

The authentication service 110 may be configured to compare the identified characters to the list of keywords received from the authentication server 108, to determine whether a certain keyword (or keywords) are included in the evidence or credential document captured in the video frame. For example, where the credential document includes a keyword of "DRIVER" or "LICENSE," the authentication service 110 may be configured to determine that the credential document has two sides to be imaged or scanned (e.g., both the front and the back of the driver's license) based on the flag or identifier associated with the keywords identified in the credential document. Additionally, where the credential document includes keywords indicating that the document is a passport, the authentication service 110 may be configured to determine that the credential document has one side to be imaged or scanned (e.g., only the front side of the passport) based on the flag or identifier associated with the keywords identified in the credential document.

Where a keyword is identified indicating that the credential document has two sides to be imaged, the authentication service 110 may be configured to prompt the user to capture video frames of the second side of the credential document. Upon capturing the video frame(s) of both the front and back-side of the credential document, the authentication service 110 may be configured to transmit, send, or otherwise provide the captured frames (e.g., front and back-side, or single side) to the authentication server 108, and the authentication server 108 may be configured to verify the evidence in the captured frames as described in greater detail below in Section 1(C). In some embodiments, the frames provided by the authentication service 110 to the authentication server 108 may not include any of the text data/keywords/flags identified by the authentication service 110 (e.g., the authentication service 110 may disregard or discard the text captured by performing the OCR locally at the client device 102). By performing OCR locally at the client device 102, the authentication service 110 may be configured to determine that the video frames have sufficient quality for imaging the credential document (e.g., since the video frames are sufficiently clear to detect characters within the image), and the authentication service 110 can determine whether the type of credential document (e.g., based on the keywords) indicates that two sides of the credential document are to be imaged. As such, by determining whether the credential document has two sides based on the video frames, the user may not be prompted to enter the type of credential document being scanned.

For certain images, for example when taking a facial image (also referred to as a "biometric image" of the person holding the client device 102, the authentication service 110 may be configured to use face detection to ensure that the face is fully within the frame, that it is oriented directly at the camera 112, and that all required facial features (eyes, nose, mouth) are detected. On client devices 102 that support capturing of depth map or data with images, the authentication service 110 may be configured to augment an image with a depth map, which provides a three-dimensional image of the object being captured. If the image is not accepted, the authentication service 110 may be configured to determine the reason for rejection and displays a hint to the user ("too dark", "face not in frame", etc.) that guides the individual to capture an acceptable image.

Upon determining that the image is acceptable, the authentication service 110 may be configured to transmit, send, or otherwise provide the captured image (e.g., along with a depth map in some implementations) to the authentication server 108. In some embodiments, the authentication service 110 may be configured to use platform or operating system features to gather a cryptographic assertion that the image was captured on a genuine client device 102 using a genuine version of the authentication service 110 which was cryptographically signed by authentication service 110. Because the authentication service 110 only captures images from a hardware camera 112 of the client device 102 (e.g., and does not permit uploading or using stored images), this prevents a potential attacker from re-implementing the authentication service 110 to transmit a digitally manipulated image of the evidence to the authentication server 108.

Some systems may use web platforms to capture evidence of identity documents. Because of the nature of the web platform, they accept and account for the risk that the images they receive may have been digitally manipulated. This is because a fraudulent actor could impersonate their web application, or use a virtual camera to give the impression that a picture was taken, when actually a digitally manipulated image was provided. The image processing required to detect these digitally manipulated images is complex and unreliable.

To mitigate this risk, the systems and methods described herein limit capturing of images to the hardware camera 112 of the client device 102. To gain confidence that the communications received by the authentication server 108 are from the client device 102, the authentication service 110 may be configured to use operating system or platform features of the client device 102 to embed a digital attestation that the client device 102 used to capture the image has not been manipulated (e.g. jail broken) and that the authentication service 110 running or executing on the client device 102 has been digitally signed by the authentication service 110 and distributed through an authorized mechanism (e.g. an authorized application store of the client device 102). The authentication server 108 may be configured to independently verify the assertion with the hardware vendor corresponding to the client device 102. Because the authentication service 110 can only be deployed on client devices 102 having a hardware camera 112, the authentication service 110 need not account for the possibility that a fraudulent actor will present digitally manipulated evidence images.

C. Verifying Evidence

Upon receiving evidence from the authentication service 110, the evidence validation service 132 may be configured to validate the image received. For identity documents, the evidence validation service 132 may be configured to extract text from the front of the document and compare it to information decoded (e.g., by the evidence validation service 132) from an encoded barcode on the back or rear image of the identity document. In some embodiments, the evidence validation service 132 may be configured to pass the images through one or more machine learning or artificial intelligence systems, such as one of those shown and described with reference to Section 4. The machine learning or artificial intelligence systems may be trained on known-valid images. When a depth map is provided, the evidence validation service 132 may be configured to pass the depth map to machine learning or artificial intelligence systems trained on similar, known-valid images. The machine learning or artificial intelligence systems may also be trained to detect classes of known-fraudulent images, such as images taken of computer screens or pieces of paper. An image is deemed acceptable if it matches the models for known-valid evidence and does not match any model for a known-fraudulent image.

In some instances, where an individual will provide the front and back of an identity document followed by a biometric image (e.g., a facial image of a user holding the client device 102), the evidence validation service 132 may analyze each of the images (e.g., the facial or biometric image, the front image of the identity document, and the rear image of the identity document) in parallel, rather than waiting for all evidence to arrive. By performing the analysis in parallel, the systems and methods described herein may improve the latency of the analysis by performing initial analysis in the background while the individual is in the process of capturing additional images. For example, if the user captures an image first of the front of the user's ID, then of the rear of the user's ID, then a biometric image of the user, the evidence validation service 132 may analyze each of these images in parallel rather than waiting for all evidence to be sent by the authentication service 110 to the authentication server 108.

Once all the required input images have been collected, and all data extracted successfully, the evidence is marked as validated, and is bound to the particular device key (e.g., by storing the validated data as authentication data 120 in association with the device key 118 in the authentication profile 116). The evidence validation service 132 may be configured to store, update, or otherwise incorporate the data (e.g., as authentication data 120) in an authentication profile 116 for the user which is uniquely associated with the device key 118 for the client device 102. If the evidence cannot be validated by the evidence validation service 132, the evidence validation service 132 may be configured to store the data in the authentication profile 116 with an indicator or other identifier noting that the evidence is not validated, and forward the evidence (e.g., the image(s)) to an admin device associated with the authentication server 108 for manual review and determination of the disposition of the evidence. Where manual review is provided and the evidence is validated (or invalidated), the feedback can be fed into the machine learning or artificial intelligence systems to further improve the fidelity of automated determinations.

D. Tracking Consent

Upon submission of evidence, the evidence validation service 132 signals to the authentication service 110 that the request can be satisfied. To satisfy the request, the authentication service 110 may use the device key to digitally sign a large random number (nonce) that is provided with the request. The authentication service 110 may provide the digital signature to the authentication server 108.

In cases where the user did not provide evidence, or where the evidence could not be validated automatically by the authentication server 108, the user may still be permitted to provide their consent to share data with the resource server(s) 106. The resource server(s) 106 may not receive the data until the validation process completes, most often by manual review, but also by out of band validation of e.g. an email address. Some data types can have multiple responsive validated data, for example a user may have validated multiple email addresses. The application service 110 may be configured to provide a user the ability to select which of the validated data they wish to share with an organization.

The authentication server 108 may be configured to use the device public key to validate the signature (e.g., against the stored public key in the application profile 116 for the user). The authentication server 108 may be configured to record that the user has consented to sharing the specific information specified in the request responsive to validating the device public key.

Often, resources 104 (or resource servers 106 hosting a particular resource 104) may collect more information or evidence than is needed to perform the transaction a user is requesting. For example, to sell alcohol, an entity may need only to know that an individual is over a particular age, but does not need to know their name, birth date or address. However, if the entity were to request an identity document containing such information (e.g., DOB, name, address) for authentication, the entity would be over-provisioned with demographic data which is not necessary for the specific purpose (e.g., to verify that the individual is over a particular age).

The systems and methods described herein may provide resources to specify the specific, derived data that is needed for authentication (a "Scope"). The evidence validation service 132 may be configured to map the validated demographic data from an authentication profile 116 to a particular defined scope for a request. For example, if an organization requested an "Over 21" scope, the evidence validation service 132 may be configured to identify the user's date of birth from the user's ID (e.g., by performing character recognition on a particular field of the user's ID). The evidence validation service 132 may, for instance, perform an optical character recognition (OCR) on the ID included in the image. Once the evidence validation service 132 recognizes the characters, the evidence validation service 132 may perform a search for a particular field (e.g., search for characters "DOB" or similar string), and identify characters which are adjacent to the identified field having a format corresponding to the field (e.g., a format of MM-DD-YYYY or similar date formatting). The evidence validation service 132 may then extract the date of birth for the user, and compare that to a criteria (e.g., over 21 based on the current date and the user's date of birth). The evidence validation service 132 may be configured to determine if the person is over 21, and if so, return only single bit true/false attestation to the resource server 106.

Some systems may use globally unique identifiers to identity individuals (a social security number, an email address, etc.). When an individual chooses to share demographic identification with an organization or entity, and when that information is bound to a globally unique identifier, that entity can forward on the demographic information to a third party.

In some embodiments, the authentication server 108 may be configured to provide a resource-specific identifier that is resistant to collusion between resources or entities. To do this, the authentication server 108 may be configured to maintain its own globally unique identifier, a random 16-byte sequence. The authentication server 108 may be configured to generate, maintain, or otherwise assign each resource another random 16-byte secret which it does not share with the resource. To derive the resource-specific individual identifier, the authentication server 108 may be configured to encrypt the globally unique identifier using the resource key (e.g., 16-byte secret) to produce a third 16-byte sequence. Because the length of the all the sequences are exactly the block size for the advanced encryption standard (AES), this encryption can be performed with a single round of AES. The resulting sequence is space efficient, and unique for each (individual, organization) pair, and bears no relationship to the global identifier. At the same time, a party that possesses the resource secret can, without relying on a database or other external storage, trivially convert between the global- and organization-specific identifiers.

In some embodiments, and as part of providing evidence, the authentication service 110 may be configured to render a user interface to the user, to select resources that are permitted to access certain evidence provided by the user. For example, the authentication service 110 may be configured to provide, e.g., on the user interface, each type, form, or specific evidence uploaded, shared, or otherwise provided by the user to the authentication service 110 (e.g., and stored as authentication data 120 in the authentication profile 116 for the user). The authentication service 110 may be configured to receive designations, tags, or other permission data associated with the authentication data 120 stored in the authentication profile 116 (e.g., based on user inputs received via the user interface of the authentication service 110). The authentication service 110 may be configured to update the authentication profile 116 to include or otherwise associate the permission data for evidence in the authentication data 120. As an example, a user may select permission data for permitting sharing some information (e.g., date of birth, residence, facial images, etc.) with the user's employer, and select other permission data for excluding sharing some information (e.g., employment information, social security or other personal identification information) with consumer websites. The authentication service 110 may be configured to update various tags or sharing settings for the authentication data 120 stored in the authentication profile 116 for the user. As such, where a resource server 106 requests a certain type of evidence, the authentication server (s) 108 may be configured to determine whether the type of evidence is permitted to be shared with the resource 104 based on the tag or sharing settings set by the user. Such implementations permit end-users to control access rights and sharing of authentication data 120 stored for the user in the user's authentication profile 116.

E. Completing Authentication

When the request has been completed, the authentication service 110 may be configured to redirect the client device 102 to a completion URL provided by the resource 104 (e.g. https://example.com/oauth2/callback). The construction of the completion URL may include variables that the resource 104 can use to retrieve the validated data about the user, and bind that user to the initial session established between the user and the resource server 106. In most cases, the session token will be valid at this point, and if it is, then the completion URL attests both to the data and to the session binding. However, if the session token is not valid, or not provided, then the completion URL attests only to the data but not to the session binding.

Figure 8:
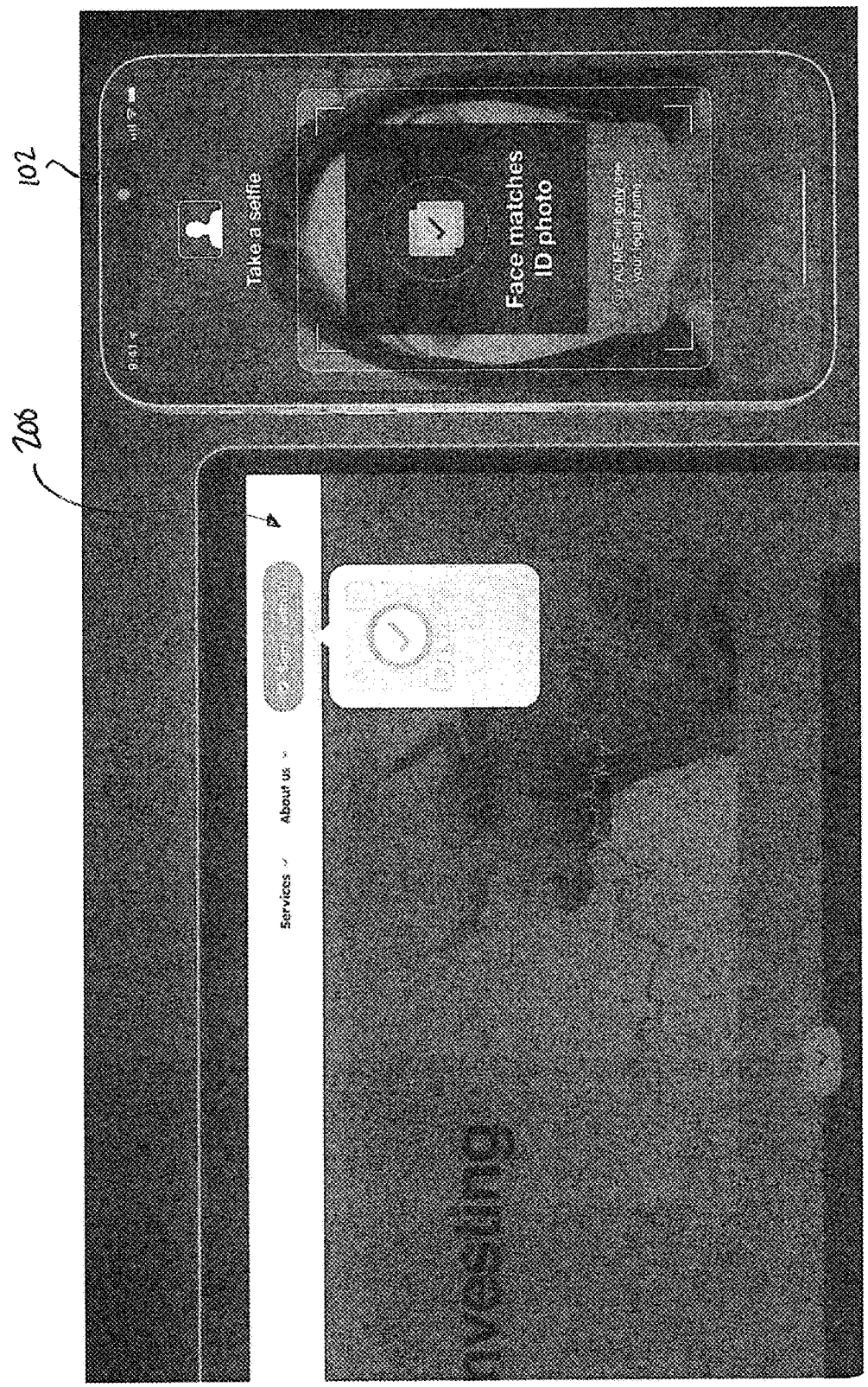
FIG. 8 is a view of the user interface of FIG. 2 and the client device of FIG. 4 following authentication of the user, according to an example implementation of the present disclosure.

The mechanism to launch this URL takes different forms depending on the method used to launch the authentication service 110. For example, when the request was initiated by a desktop web browser, the browser may be configured to monitor the status of the request and when it has been completed, the browser receives the completion URL from the authentication service 110, and directs the browser to the completion URL. When the request was initiated on the mobile device, the completion URL may be launched directly by the authentication service 110. In some embodiments, the host of the resource 104 may be configured to register a webhook with the authentication server(s) 108, which provides a server-to-server notification that new validated data have been shared, but which does not provide any session binding. Once the resource(s) 104 receive the validated information, the resource(s) 104 may authenticate the user and permit access of the user to the resource 104 using the validated information (as shown in FIG. 8).

F. Additional Use Cases

In some scenarios, it may be inefficient or undesirable to implement the request completion flow via an actual client device 102. For example, to ensure that people entering a bar are over 21 years old, the bar may post a QR code associated with the authentication server 108 that initiates a request that requires the "Over 21" scope. Individuals would scan the QR code and provide the evidence and authorization to share, but would not launch the completion URL. Instead, their client device 102 (e.g., the authentication service 110 executing on the client device 102) may be configured to display a screen with their picture and text indicating that they've met the requirements and shared the data. The user could then show their client device 102 user interface to staff who could visually inspect the user interface prior to admitting the individual. However, this scenario is vulnerable to a fraudulent individual taking a screenshot of such an image and digitally manipulating it to show they've met the requirements when they have not in fact done so. To combat this, the user interface may show a combination of elements that, taken together, allows the staff or security guard to quickly visually inspect the user interface to know that it is genuine. These elements may be or include (1) a validated profile photo of the person, (2) a background image that is generated in real time using the device camera so that it changes as the client device 102 moves, (3) the name and/or icon of the entity/company/bar, and (4) an optional QR code. In cases where the security official is suspicious of the person, they can scan the QR code to validate that the attestation is genuine.

Some multi-factor authentication schemes may be vulnerable to phishing. Phishing occurs when an individual is tricked into thinking they are signing in to a service operated by a host of a resource, but in fact they are signing in to a look-alike service operated by a fraudulent actor. In general, individuals perform poorly at differentiating between organizations they trust and fraudulent actors. The root of this problem is that, when a service receives a web request, it cannot reliably tell that it is interacting with an individual's web browser, or if there is a fraudulent actor intercepting and relaying the messages.

As shown in FIG. 9, to mitigate this risk, authentication server 108 allows a sign in flow that allows the authentication server 108 to regain positive control over the URL in the individual's browser. Instead of automatically launching the completion URL at the end of the flow, the authentication service 110 may display a message directing the user to a short, easy-to-type web address, e.g. "ntsigin.com," that is used to regain positive control over the URL in the user's browser. When the user launches the address, the user may be directed to enter a short (e.g. two-digit) code. The authentication server(s) 108 may be configured to verify that the session token and the two digit code are valid. Only upon successful entry of the code, the authentication server 108 may be configured to return the completion URL to the client device 102 to allow the process to complete. If an attacker were intercepting and relaying the initial request via a phishing site, the attacker would not be able to observe the completion URL because the individual types the URL, rather than clicks a link or automatically completes a flow. Because this process is more onerous than the normal flow, the process may be used only in cases where the authentication server 108 lacks confidence of positive control over the URL. On mobile browsers, however, the authentication service 110 may have positive control over the URL (and as such, the risk is reduced). However, on desktop browsers, an initial request via the browser may involve performing the process flow 900. However, on subsequent request, the authentication server(s) 108 can be assured of positive control by inspecting a special-purpose cookie set on the first request (the Long Term Cookie).

2. Systems and Methods for Account Recovery

Some authentication systems may not address provisioning problems. Rather, such systems may establish the initial trust between the individual and the identity provider out-of-band. When that trust is broken, e.g. because a person has lost their mobile device or forgotten their password, that trust may be re-established out-of-band.

To solve this problem, the systems and methods described herein may implement an account recovery system. When the authentication server(s) 108 receive an identity document and successfully verify it, the account management service 114 may be configured to cross-reference the accounts database 124 for the set of authentication profiles with the same birth date as on the document. The account management service 114 may be configured to perform face comparison between the biometric image received from the client device 102 against the profile image(s) 122 for the other individuals with the same birth date. Responsive to identifying a biometric match, the account management service 114 may be configured to present an option (e.g., via the authentication service 110) to merge their new device key (e.g., for the new client device 102 or for an existing client device 102 with a lost password or otherwise lost trust) with the existing data collected and stored in the authentication profile 116.

The systems and methods described herein have the advantage of being transparent to and easy for the individual, robust to demographic changes such as name or gender, and robust from a security perspective.

Figure 10:
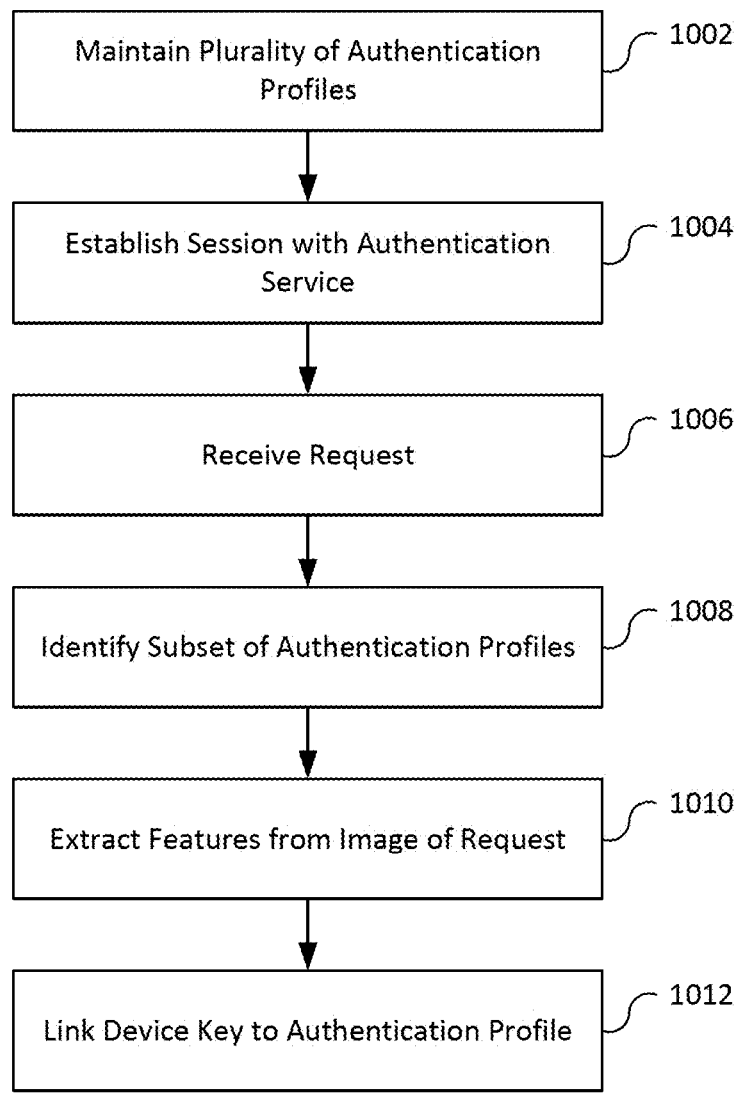
FIG. 10 is a block diagram of an example system using supervised learning, according to an example implementation of the present disclosure.

Referring now to FIG. 10 with reference to FIG. 1, depicted is a flowchart showing a method 1000 of recovering an account, according to an example implementation of the present disclosure. The method 1000 may be performed by the components or elements described above with reference to FIG. 1-FIG. 9 and FIG. 12-FIG. 14. As a brief overview, at step 1002, the method 1000 includes maintaining a plurality of authentication profiles. At step 1004, the method 1000 includes establishing a session with an authentication service. At step 1006, the method 1000 includes receiving a request. At step 1008, the method 1000 includes identifying a subset of authentication profiles. At step 1010, the method 1000 includes extracting features from image of request. At step 1012, the method 1000 includes linking a device key to an authentication profile.

At step 1002, the method 1000 includes maintaining a plurality of authentication profiles. In some embodiments, the account management service 114 may maintain the plurality of authentication profiles 116. As described above, the authentication profiles 116 may each correspond to a respective user (e.g., end user of the authentication service 110). The authentication profiles 116 may be established by a user upon downloading or otherwise accessing the authentication service 110 (e.g., on a client device 102). The authentication service 110 may be or include a micro-application, a native application, a Software as a Service (SaaS) application, or any other type of application or service executable on the client device 102, for authenticating the user of the client device 102 via data from the authentication profile 116 for the user maintained at the authentication server 108, to a resource 104 of a resource server 106 (e.g., so that the user may access the resource 104).

The user may establish the authentication profile 116 by uploading, sharing, or otherwise providing various authentication data 120 via the authentication service 110 to the account management service 114 for including in the authentication profile 116 for the user. As part of providing the authentication data 120, the user may select sharing settings for each type, form, or specific authentication data 120 of the data set, for sharing to particular resources 104. The user may also capture one or more profile images 122 for including in the authentication profile 116. The profile images 122 may include, for example, images captured via a forward-facing camera 112 of the client device 102 (e.g., "selfies"), images of an identification document (such as a passport or driver's license) captured via a camera 112 of the client device 102, etc. The authentication server 108 may receive the authentication data (e.g., from the client device 102 executing the authentication service 110). The evidence verification service 132 and/or a biometric validation service 134 may be configured to match images of the user against images of the identification document (e.g., by extracting features from both images and doing a comparison of those images). The account management service 114 may be configured to store the images as profile images 122 responsive to the images being matched to within a threshold. The account management service 114 may establish or otherwise generate a new authentication profile 116, which stores the images as profile images 122 and authentication data 120 from the user.

In some embodiments, the biometric validation service 134 may extract features from the profile images 122. For example, the biometric validation service 134 may process the profile images 122 (e.g., using one or more image processing and/or feature extraction algorithms) to identify one or more features for the profile images 122. The biometric validation service 134 may identify, for example, facial characteristics and/or traits of the user depicted or represented in the profile images 122. The biometric validation service 134 may generate a feature-set for each profile image 122, for storage in association with the respective profile image 122 in the authentication profile 122.

The account management service 114 may store the authentication data 120 and profile images 122 in association with a device key 118 of the client device 102, in the accounts database 124. The authentication service 110 may be configured to generate the device key 118 for the client device 102 as part of or in connection with generating the authentication profile 116. The device key 118 may be or include an identifier, string, or other unique value associated with the client device 102. The authentication service 110 may generate the device key for the client device 102. The authentication service 110 may use hardware security features of the client device 102 to generate, establish, or otherwise identify a cryptographic public/private key pair, for generating the device key for the client device 102. The device key may be uniquely associated with the client device 102. The device key may be unexportable, in that only one device key is associated with one particular client device 102. In this regard, since the authentication service 110 is executing on a different client device 102 (e.g., a client device 102 which was previously not used for executing an instance of the authentication service 110), the device key generated as part of a new request originating from a new client device 102 may not be associated with any known device keys.

The account management service 114 may store, incorporate, or otherwise maintain the authentication data 120, profile images 122, and device key 118 as an authentication profile 116 in an accounts database 124. Each authentication profile 116 may be associated with a particular (e.g., individual) user. In other words, the account management service 114 may maintain a plurality of authentication profiles 116 (e.g., each including authentication data 120, one or more profile images 122, and a device key 118), with each authentication profile 116 corresponding to a unique end user.

At step 1004, the method 1000 includes establishing a session with an authentication service. In some embodiments, the authentication server 108 may establish the session with the authentication service 110 executing on the client device 102. The authentication server 108 may establish the session with the authentication service 110 responsive to a user of the client device 102 opening, launching, deploying, initiating, or otherwise accessing the authentication service 110 on the client device 102. In some instances, the user may have previously established an authentication profile 116 on a different client device 102, and subsequently access the authentication service 110 (e.g., a new instance of the authentication service 110) on a new client device 102 (responsive to losing or replacing their client device 102, for instance). The authentication server 108 may establish the session with the new client device 102 hosting or otherwise executing the authentication service 110. As such, because the authentication server 108 is establishing a session with a new client device 102, a device key for the client device 102 may not be associated with any known or maintained device keys in association with an authentication profile 116 (particularly the authentication profile 116 for the user of the new client device 102).

At step 1006, the method 1000 includes receiving a request. In some embodiments, the authentication server 108 may receive a request including a device key of the client device 102, a date of birth of a user of the client device 102, and a biometric image captured using a camera 112 of the client device 102 controlled by the authentication service 110. The authentication server 108 may receive the request on the session established at step 1004. In some embodiments, the authentication service 110 may receive a user input including the date of birth of the user of the client device 102 (e.g., on a user interface generated by the authentication service 110). The authentication service 110 may also control the camera 112 for capturing the biometric image of the user. As part of controlling the camera 112, the authentication service 110 may generate or provide a cryptographic assertion for images captured by the camera 112, indicating (e.g., to the authentication service 110) that the image was not altered or digitally manipulated, was not uploaded from storage, etc. Rather, the cryptographic assertion may indicate that the biometric image captured by the camera 112 was captured by the hardware camera 112 of the client device 102. The authentication service 110 may generate a device key for the new client device 102 in a manner similar to generation of the device key for establishing a new authentication profile 116. In this regard, the device key may be a new device key associated with a user of the client device 102, since the client device 102 is a new client device 102 (e.g., not previously used for accessing the authentication service 110).

In some embodiments, the request may include an image of an identification document (ID) for the user. The authentication service 110 may control the camera 112 for capturing the image of the ID. The authentication service 110 may generate, include, incorporate, or otherwise provide a cryptographic assertion for the image of the ID in a manner similar to the cryptographic assertion generated for the biometric image(s) captured by the camera 112. The ID may include, among other information, an image of the user and a date of birth of the user.

The authentication service 110 may generate the request to include the device key, the biometric image of the user, and the date of birth of the user of the client device 102. In some embodiments, the authentication service 110 may generate the request when the authentication service 110 is first launched, executed, or otherwise accessed at the client device 102. For example, the authentication service 110 may generate the request as part of recovering an account of the user of the client device 102 and/or otherwise associating the authentication profile 116 for the user with the new client device 102. In some embodiments, the authentication service 110 may generate the request as part of a request to authenticate the user of the client device 102 to a resource. For example, the authentication service 110 may generate the request responsive to the user navigating to a resource 104 and requesting to authenticate to the resource 104 via the authentication service 110. The authentication service 110 may transmit, send, or otherwise provide the request via the session (e.g., established at step 1004) to the authentication server 108. In this regard, the request (e.g., received at step 1006) may be or include an authentication request, and/or an account recovery request.

The authentication server 108 may receive the request including the biometric image. In some embodiments, the authentication server 108 may authenticate the biometric image based on the cryptographic assertion received from the client device 102. The authentication server 108 may authenticate the biometric image from the request, responsive to identifying the cryptographic assertion generated by the authentication service 110 for the biometric image. The authentication server 108 may authenticate the biometric image as captured by a hardware camera 112 of the client device 102 responsive to identifying the cryptographic assertion. The authentication server 108 may authenticate the biometric image as not being digitally altered, modified, or uploaded by the client device 102 from memory (e.g., rather than captured by the hardware camera 112). The authentication server 108 may similarly authenticate other images including, for example, an image of an ID captured by the client device 102 (e.g., based on a cryptographic assertion generated by the client device 102 for the image of the ID).

In some embodiments, where the request includes an image of the ID of the user, the authentication server 108 may identify, determine, or otherwise extract the date of birth for the user and an image of the user's face from the ID. The authentication server 108 may extract the date of birth for the user by performing optical character recognition (OCR) of the image of the ID, to detect or identify characters having a format matching a date of birth format (e.g., characters "DOB" adjacent to "DD-MM-YYYY"). The authentication server 108 may extract the image of the user's face for the ID by performing facial recognition of the image of the ID. The authentication server 108 may compare the biometric image of the request to the image of the user's face extracted from the ID. For example, the authentication server 108 may extract features of the image of the user's face from the ID, and compare those features extracted from the biometric image of the user's face. The authentication server 108 may extract features from the image of the user's face from the ID and biometric image in a manner similar to step 1010 described below. The authentication server 108 may compare the features from the image of the face of the user and the biometric image, to authenticate the user. In some embodiments, the authentication server 108 may authenticate the user of the client device 102 responsive to features extracted from the image of the user's face from the biometric image matching features extracted from the user's face from the ID (e.g., to within a matching criteria).

At step 1008, the method 1000 includes identifying a subset of authentication profiles 116. In some embodiments, the account management service 114 may identify the subset of authentication profiles 116 from the accounts database 124. The account management service 114 may identify the subset of authentication profiles 116 from the plurality of authentication profiles 116 maintained in the accounts database 124 at the authentication server 108. The account management service 114 may identify the subset of authentication profiles 116 based on or according to the date of birth included in the request. For example, the account management service 114 may apply a filter to the authentication profiles 116 using the date of birth included in the request received at step 1006, to identify the subset of authentication profiles 116 having authentication data 120 including a date of birth which matches the date of birth from the request. By applying a filter based on date of birth, the authentication management service 114 may be more likely to identify a matching authentication profile from the accounts database 124, as other authentication data 120 may change over time (e.g., first and last name, gender, home address, employment, etc.). However, end user's date of birth do not change, and therefore this authentication data 120 of the user's authentication profile 116 is persistent.

In some embodiments, the account management service 114 may determine to identify the first subset of authentication profiles at step 1008. The account management service 114 may determine to identify the first subset based on the device key from the request received at step 1006. The account management service 114 may determine to identify the first subset by performing a look-up function in the accounts database 124 using the device key from the request. The account management service 114 may determine to identify the first subset responsive to determining that the device key from the request does not match a known device key (e.g., a device key in any authentication profiles 116 maintained in the accounts database 124).

At step 1010, the method includes extracting features from an image of request. The biometric validation service 134 may extract features from the biometric image of the request received at step 1006. The biometric validation service 134 may extract features from the biometric image using one or more image processing or feature extraction algorithms, to identify facial characteristics and/or traits of the user in the biometric image. The features may include facial markers generated by or used as part of facial recognition, for example.

The biometric validation service 134 may compare the features (e.g., facial characteristics and/or traits) extracted from the biometric image at step 1010 to features extracted from the profile images 122. For example, the biometric validation service 134 may compare the features from the biometric image to feature sets which are stored in association with the profile images 122, for each of the subset of authentication profiles 116. The biometric validation service 134 may identify a profile image 122 which matches the biometric image responsive to the features extracted from the biometric image satisfying a matching criteria for the profile image 122 (e.g., the features matching a plurality of markers of the feature set for the profile image 122 to within a threshold). By applying the filter by date of birth at step 1008, the biometric validation service 134 may consume less computing resources for matching the biometric image (e.g., from the request) to fewer profile images 122, thus conserving overall computing resources by the authentication server 108.

At step 1012, the method includes linking a device key to an authentication profile. In some embodiments, the account management service 114 may link the device key of the client device 102 from the request received at step 1006 to an authentication profile, responsive to determining that the one or more features from the biometric image match the features extracted from the profile image 122 of the authentication profile 116. The account management service 114 may link the device key of the client device 102 to the authentication profile 116 which includes the profile image 122 having the features which match the features extracted from the biometric image (e.g., feature(s) of the biometric image matching features from the feature set of the profile image 122). The account management service 114 can link the device key to the authentication profile 116 by storing, incorporating, updating, registering, or otherwise including the device key for the client device 102 as a registered device key 118 in the authentication profile 116. In some embodiments, the account management service 114 may purge, remove, or otherwise remove the device key 118 for the previous client device 102. The account management service 114 may remove the device key 118 for the previous client device 102 responsive to including the new device key 118 for the new client device 102. In some embodiments, the account management service 114 may add the new device key 118 in a device key chain (e.g., including previous device keys 118 for other client devices 102) in the authentication profile 116.

In some embodiments, the authentication server 108 may transmit, send, or otherwise provide a request to the client device 102. The request may be or include a request to merge the device key for the client device 102 with the authentication profile (e.g., to be linked at step 1012). The authentication server 108 may transmit the request (e.g., on the session established at step 1004) to the client device 102 for rendering (e.g., via the authentication service 110). The authentication server 108 may transmit the request to the client device 102 responsive to identifying a candidate authentication profile 116 for merging with the device key for the client device 102. The authentication server 108 may transmit the request to the client device 102 responsive to identifying the candidate authentication profile 116 including the profile image 122 having features which match features of the biometric image of the request. The authentication server 108 may transmit the request to the client device 102 prior to linking the device key 118 to the authentication profile 116. The authentication server 108 may link the device key 118 to the authentication profile based on or according to a response to the request sent to the client device 102 (e.g., indicating that the user accepted merging the device key and the authentication profile 116).

In some embodiments, the authentication server 108 may receive a request to authenticate the user of the client device 102 to a resource server 106. The authentication server 108 may receive the request on the session (e.g., established at step 1004) and/or on a different or new session. The authentication server 108 may receive the request from the authentication service 110 executing on the client device 102, as part of the client device 102 attempting to access a resource 104 on the resource server 106. The authentication server 108 may receive the request including a second biometric image of the user (e.g., captured via the hardware camera 112 of the client device 102). The authentication server 108 may authenticate the user of the client device to the resource server 106 based on the second biometric image of the user. For example, the authentication server 108 may extract features from the second biometric image, and compare the features from the second biometric image to features from profile images 122 of an authentication profile 116 identified using a device key 118 from the authentication request. The authentication server 108 may authenticate the user of the client device 102 to the resource server 106 responsive to the features of the second biometric image matching one or more features from a profile image 122. The authentication server 108 may authenticate the user to the resource server 106 by making an assertion to the resource server 106, by transmitting authentication data 120 to the resource server 106 (e.g., as permitted based on sharing settings for the authentication data 120), etc.

3. Systems and Methods for User Verification

After an individual has initially established their identity with the authentication server 108, their underlying demographic data may change. For example, a user may move to a different state and get a new driver license or other identification document. The systems and methods described herein may be configured to permit users to update the demographic data they may have previously provided, but may not permit users to replace their demographic data with that of a different person. In other words, a device key, and all that is derived from it (including any authentication data 120 stored or otherwise linked to an authentication profile 116 associated with the device key 118), should belong to exactly one individual human. There is a class of fraud that involves swapping identities (e.g. back and forth between two different people). Without a way to prevent this, the systems and methods described herein would not be able to ensure or guarantee the identity of the individual.

To ensure that each authentication profile 116 is associated with a particular user (e.g., a singular user), when a user uploads an identification document (ID) and biometric image, and when that ID/biometric image pair is successfully validated, the biometric validation service 134 may be configured to append a reference to the biometric image in a permanent list (e.g., as a profile image 122) for that individual. Each time the person takes a new biometric image (e.g., which is subsequently validated), a reference to that biometric image is added to the profile images 122 in the authentication profile 116 for the user. In the event that an individual provides evidence of a new ID and biometric image, and that evidence is valid, the biometric validation service 134 may be configured to compare the biometric image and image from the ID to the profile images 122. The biometric validation service 134 may be configured to determine whether at least one profile image 122 in the authentication profile 116 is a biometric match to the biometric image/image from the ID. If the biometric image/image from the ID is not a biometric match to at least one profile image 122, the biometric validation service 134 may be configured to determine that the ID is invalid.

Figure 11:
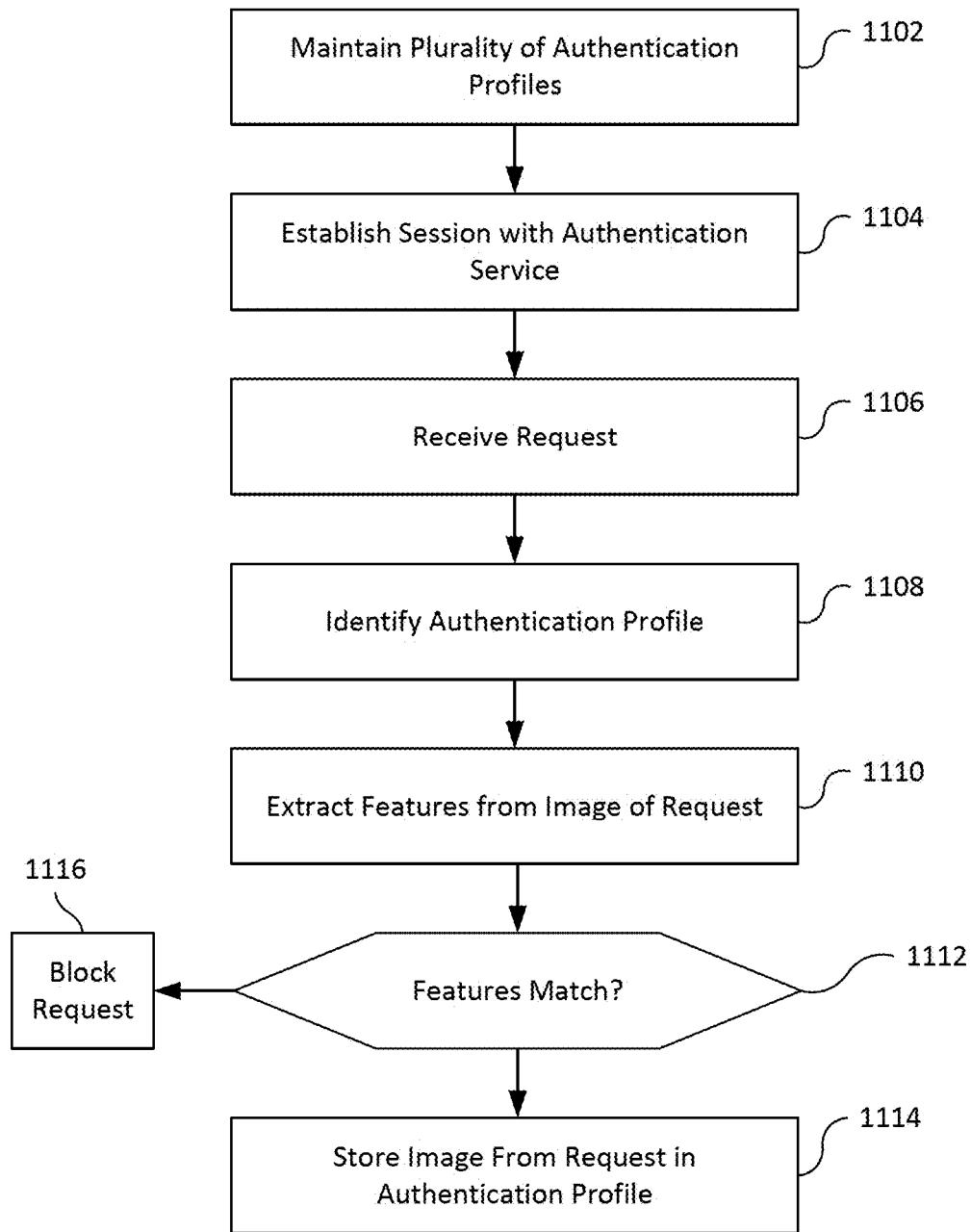
FIG. 11 is a block diagram of a simplified neural network model, according to an example implementation of the present disclosure.

Referring now to FIG. 11 with reference to FIG. 1, depicted is a flowchart showing a method 1100 for user verification, according to an example implementation of the present disclosure. The method 1100 may be performed by the components or elements described above with reference to FIG. 1-FIG. 9 and FIG. 12-FIG. 14. As a brief overview, at step 1102, the method 1100 includes maintaining a plurality of authentication profiles. At step 1104, the method 1100 includes establishing a session with an authentication service. At step 1106, the method 1100 includes receiving a request. At step 1108, the method 1100 includes identifying an authentication profile. At step 1110, the method 1100 includes extracting features from image of request. At step 1112, the method 1100 includes determining whether features from the image match features from an image of the authentication profile. At step 1114, the method 1100 includes storing the image from the request in the authentication profile. At step 1116, the method 1100 includes blocking the request.

At step 1102, the method 1100 includes maintaining a plurality of authentication profiles. In some embodiments, the authentication server 108 may maintain the plurality of authentication profiles 116. The authentication profiles 116 may include, among other data and information, one or more profile images 122 and a device key 118 linked to a respective client device 102 of the user for the authentication profile 116. Step 1102 may be similar to step 1002 described above with reference to FIG. 10. At step 1104, the method 1100 includes establishing a session with an authentication service 110. In some embodiments, the authentication server 108 may establish the session with the authentication service 110 executing on a client device 102 of a user. Step 1104 may be similar to step 1004 described above with reference to FIG. 10.

At step 1106, the method 1100 includes receiving a request. In some embodiments, the authentication server 108 may receive a request from the client device 102 via the session with the authentication service 110 executing on the client device 102. The authentication server 108 may receive the request including a device key for the client device 102 and a biometric image captured using a camera 112 of the client device 102 controlled via the authentication service 110. The request may be or include a request to authenticate the user of the client device 102 to a third-party server (such as a resource server 106) hosting or otherwise providing a resource 104. The user may navigate (e.g., via the client device 102) to a page, link, tab, widget, or application corresponding to the resource 104, and select a user interface element for authenticating the user via the authentication service 110 for accessing the resource 104. The authentication service 110 may request at least a biometric image of the user as part of authenticating the user (e.g., via the authentication server 108) to the resource server 106. The authentication service 110 may control the camera 112 (e.g., the hardware camera 112) to facilitate capturing the biometric image of the user. In some embodiments, the request may include an identification document (ID) for the user. Similar to capturing the biometric image, the authentication service 110 may control the camera 112 to facilitate capturing of an image of the ID for the user.

The authentication service 110 may generate the request to include the biometric image (and the image of the ID) along with the device key for the client device 102. As described above with reference to FIG. 10, the device key may be or include a unique identifier, string, or other key which is uniquely associated with the client device 102 and generated by the authentication service 110 as part of the user initially accessing the authentication service 110 on the client device 102 (e.g., at the first instance). The authentication service 110 may transmit, send, or otherwise provide the request, including the biometric image, the image of the ID, and device key, to the authentication server 108 on the session established at step 1104. The authentication server 108 may receive the request on the session, including the device key, biometric image, and image of the ID.

In some embodiments, the authentication server 108 may authenticate the user based on the biometric image and the image of the ID. For example, the authentication server 108 may extract features from the biometric image of the user's face, and identify another image of the user's face from the image of the ID. The authentication server 108 may extract features from these images in a manner similar to step 1010 described above with reference to FIG. 10. The authentication server 108 may compare the features extracted from the biometric image to the features extracted from the image of the ID. The authentication server 108 may authenticate the user based on the features from the images satisfying a matching criteria or threshold. As such, the authentication server 108 can ensure that the user providing the biometric image is in fact the same user as providing the image of the ID. In some embodiments, the authentication server 108 may authenticate the images as captured by the hardware camera 112 of the client device 102. The authentication server 108 may authenticate the images (e.g., biometric image and/or image of the ID) as captured by the hardware camera 112, based on a cryptographic assertion provided by the authentication service 110 with the images.

At step 1108, the method 1100 includes identifying an authentication profile. In some embodiments, the authentication server 108 may identify the authentication profile corresponding to the user based on the device key from the request. For example, the authentication server 108 may extract, determine, or otherwise identify the device key from the request received at step 1106. The authentication server 108 may perform a look-up using the device key from the request in the accounts database 124, to identify an authentication profile having a device key which matches the device key from the request. In this regard, the authentication server 108 may identify the authentication profile 116 for the user responsive to the device key from the request matching the device key 118 from the authentication profile 116. In instances where the authentication server 108 does not identify an authentication profile 116 having a matching device key 118, the authentication server 108 may prompt, initiate, or otherwise cause (e.g., via the authentication service 110) the user to establish or otherwise generate a new authentication profile 116 (or merge the device key with a previous authentication profile 116 for the user as described above with reference to FIG. 10).

At step 1110, the method 1100 includes extracting features from image of request. In some embodiments, the authentication server 108 may identify, determine, detect, or otherwise extract features from the biometric image included in the request (e.g., received at step 1106). The authentication server 108 may extract the features from the biometric image in a manner similar to step 1010 described above with reference to FIG. 10. In some embodiments, and as described above with respect to authenticating the user, the authentication server 108 may also extract features from the image of the ID from the request. The authentication server 108 may extract features from the image of the user included in the image of the ID, for comparison to the features extracted from the biometric image of he user.

At step 1112, the method 1100 includes determining whether features from the image match features from an image of the authentication profile. In some embodiments, the authentication server may compare the features extracted from the biometric image (e.g., at step 1110) to one or more features extracted from a profile image 122 included in the authentication profile 116 identified at step 1108). As described above with reference to step 1002 of FIG. 10, the authentication server 108 may store, maintain, or otherwise associate a feature set for each profile image 122 of the authentication profile 116 with the corresponding profile image 122. The authentication server 108 may compare the feature set for one or more profile images 122 to the features extracted from the biometric image at step 1110. In some embodiments, the authentication server 108 may compare the features extracted from the biometric image to each feature set for each profile image 122 included in the authentication profile 116. In some embodiments, the authentication server 108 may iteratively compare the features extracted from the biometric images to the profile images 122 (e.g., beginning with the most recent profile image 122 identified by the authentication server 108 based on a timestamp corresponding to the profile image 122). The authentication server 108 may compare the features of the profile image(s) 122 to the features of the biometric image, to determine whether the features satisfy a matching criteria. For example, the authentication server 108 may determine that the features of the respective images satisfy the matching criteria by determining that the feature set for the biometric image match the features extracted from the biometric image, in a manner similar to a facial recognition analysis. Where the features satisfy the matching criteria, the method 1100 may proceed to step 1114. Where the features do not satisfy the matching criteria (and, additionally or alternatively, the user is not authenticated based on the comparison of the biometric image to the image from the ID), the method 1100 may proceed to step 1116.

At step 1114, the method 1100 includes storing the image from the request in the authentication profile. In some embodiments, the authentication server 108 may store the biometric image in the authentication profile 116 (e.g., identified at step 1108) responsive to determining that the features extracted from the biometric image match features extracted from a profile image of the authentication profile 116 (e.g., at step 1112). The authentication server 108 may store the biometric image as a new profile image 122 in the authentication profile 116. The authentication server 108 may store the biometric image with a timestamp (e.g., indicating the time of capture, the time of receipt of the request, and so forth) in the authentication profile 116. The authentication server 108 may store the biometric image as a new profile image 122 together with previous profile images 122. In this regard, the profile images 122 for the authentication profile 116 may together form a chain of profile images 122.

In some embodiments, step 1114 may further include the authentication server 108 authenticating the user to the resource server 106. The authentication server 108 may authenticate the user to the resource server 106 based on the request received at step 1106. As described above, the request may be or include a request to authenticate the user to the resource server 106, to access the resource 104 hosted on the resource server 106. The authentication server 108 may authenticate the user responsive to determining that the features extracted from the biometric image match the features from a profile image 122 of the authentication profile 116 for the user. The resource server 106 may permit the user access to the resource 104 responsive to the authentication server 108 authenticating the user to the resource server 106.

At step 1116, the method 1100 includes blocking the request. In some embodiments, the authentication server may block the request received at step 1106, responsive to determining that the biometric image does not match one or more profile images 122 of the authentication profile 116 identified at step 1108. The authentication server 108 may block the request by responding, e.g., to the authentication service 110, indicating that additional authentication information is needed to authenticate the user. Where additional authentication information is received (e.g., via the authentication service 110 from the user), the authentication server 108 may authenticate the user based on a comparison of the authentication information to the authentication data 120 included in the authentication profile 116. Upon authenticating the user, the method 1100 may proceed back to step 1114, where the authentication server 108 stores the biometric image as a new profile image 122 in the authentication profile. In some embodiments, the authentication server 108 may block the request by indicating that the user cannot be authenticated.

4. Machine Learning and Artificial Intelligence Systems

Figure 12:
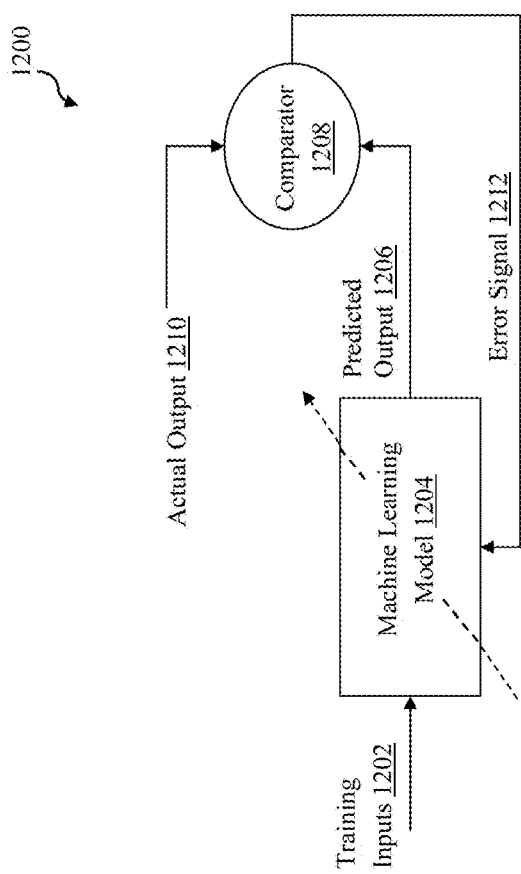
FIG. 12 is a block diagram illustrating an architecture for a computer system that can be employed to implement elements of the systems and methods described and illustrated herein.

Referring to FIG. 12, a block diagram of an example system using supervised learning, is shown. The system shown in FIG. 12 may be used by or included as a component of the evidence validation service 132. Supervised learning is a method of training a machine learning model given input-output pairs. An input-output pair is an input with an associated known output (e.g., an expected output).

Machine learning model 1204 may be trained on known input-output pairs such that the machine learning model 1204 can learn how to predict known outputs given known inputs. Once the machine learning model 1204 has learned how to predict known input-output pairs, the machine learning model 1204 can operate on unknown inputs to predict an output.

The machine learning model 1204 may be trained based on general data and/or granular data (e.g., data based on a specific user 1232) such that the machine learning model 1204 may be trained specific to a particular user 1232.

Training inputs 1202 and actual outputs 1210 may be provided to the machine learning model 1204. Training inputs 1202 may include, for example, known fraudulent images or digitally manipulated images, fake identification documents (IDs) such as fake driver's licenses, legitimate IDs, and the like. Actual outputs 1210 may include, for example, flags or identifiers which indicate whether the images are legitimate or fraudulent.

The inputs 1202 and actual outputs 1210 may be received from one or more data structures or data repositories, from government entity repositories, and so forth. For example, a data repository may contain images of fraudulent as well as legitimate evidence which may be requested as part of an authentication process or flow. The data repository may also contain data associated with flags or identifiers which indicate whether the evidence is fraudulent or legitimate. Thus, the machine learning model 1204 may be trained to predict whether evidence provided by a user is fraudulent or legitimate based on the training inputs 1202 and actual outputs 1210 used to train the machine learning model 1204.

In some embodiments, a single machine leaning model 1204 may be trained to make one or predictions relating to the evidence provided by the user. In some embodiments, a plurality of machine learning models 1204 may be trained to make the one or more predictions. For example, a first machine learning model 1204 may be trained to predict whether the evidence was legitimately captured by the client device 102, a second machine learning model 1204 may be trained to predict whether the evidence has been digitally altered, and so forth. The comparator 1208 may compare the predicted outputs 1206 to actual outputs 1210 to determine an amount of error or differences.

During training, the error (represented by error signal 1212) determined by the comparator 1208 may be used to adjust the weights in the machine learning model 1204 such that the machine learning model 1204 changes (or learns) over time. The machine learning model 1204 may be trained using a backpropagation algorithm, for instance. The backpropagation algorithm operates by propagating the error signal 1212. The error signal 1212 may be calculated each iteration (e.g., each pair of training inputs 1202 and associated actual outputs 1210), batch and/or epoch, and propagated through the algorithmic weights in the machine learning model 1204 such that the algorithmic weights adapt based on the amount of error. The error is minimized using a loss function. Non-limiting examples of loss functions may include the square error function, the root mean square error function, and/or the cross entropy error function.

The weighting coefficients of the machine learning model 1204 may be tuned to reduce the amount of error, thereby minimizing the differences between (or otherwise converging) the predicted output 1206 and the actual output 1210. The machine learning model 1204 may be trained until the error determined at the comparator 1208 is within a certain threshold (or a threshold number of batches, epochs, or iterations have been reached). The trained machine learning model 1204 and associated weighting coefficients may subsequently be stored in memory 1216 or other data repository (e.g., a database) such that the machine learning model 1204 may be employed on unknown data (e.g., not training inputs 1202). Once trained and validated, the machine learning model 1204 may be employed during a testing (or an inference phase). During testing, the machine learning model 1204 may ingest unknown data to predict future data (e.g., legitimate vs. illegitimate evidence).

Figure 13:
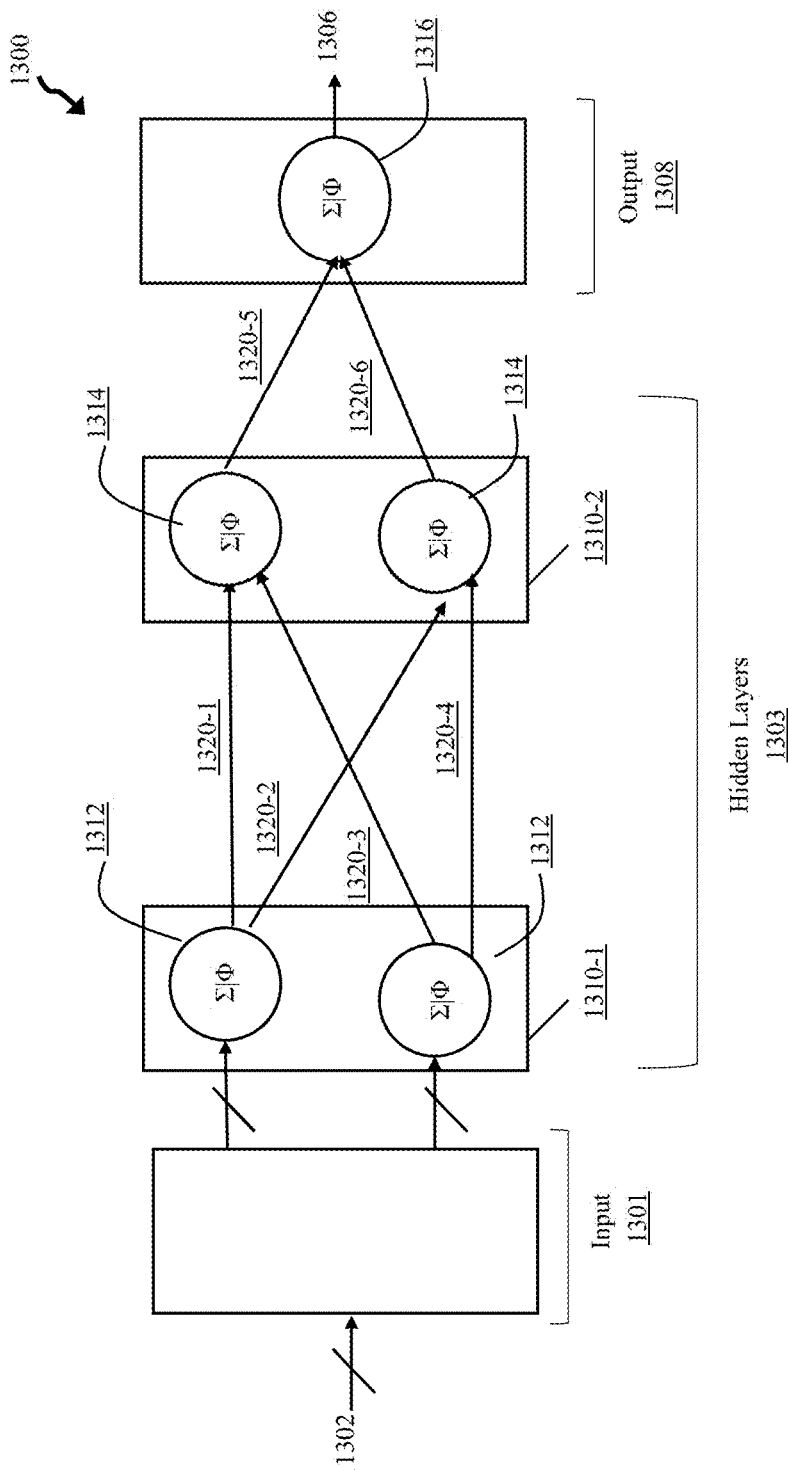
FIG. 13 is a block diagram of a simplified neural network model, according to an example implementation of the present disclosure.

Referring to FIG. 13, a block diagram of a simplified neural network model 1300 is shown. The neural network model 1300 may include a stack of distinct layers (vertically oriented) that transform a variable number of inputs 1302 being ingested by an input layer 1304, into an output 1306 at the output layer 1308.

The neural network model 1300 may include a number of hidden layers 1310 between the input layer 1304 and output layer 1308. Each hidden layer has a respective number of nodes (1112, 1314 and 1316). In the neural network model 1300, the first hidden layer 1310-1 has nodes 1312, and the second hidden layer 1310-2 has nodes 1314. The nodes 1312 and 1314 perform a particular computation and are interconnected to the nodes of adjacent layers (e.g., nodes 1312 in the first hidden layer 1310-1 are connected to nodes 1314 in a second hidden layer 1310-2, and nodes 1314 in the second hidden layer 1310-2 are connected to nodes 1316 in the output layer 1308). Each of the nodes (1112, 1314 and 1316) sum up the values from adjacent nodes and apply an activation function, allowing the neural network model 1300 to detect nonlinear patterns in the inputs 1302. Each of the nodes 1312, 1314 and 1316) are interconnected by weights 1320-1, 1320-2, 1320-3, 1320-4, 1320-5, 1320-6 (collectively referred to as weights 1320). Weights 1320 are tuned during training to adjust the strength of the node. The adjustment of the strength of the node facilitates the neural network's ability to predict an accurate output 1306.

In some embodiments, the output 1306 may be one or more numbers. For example, output 1306 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

5. Computer Architecture

Figure 14:
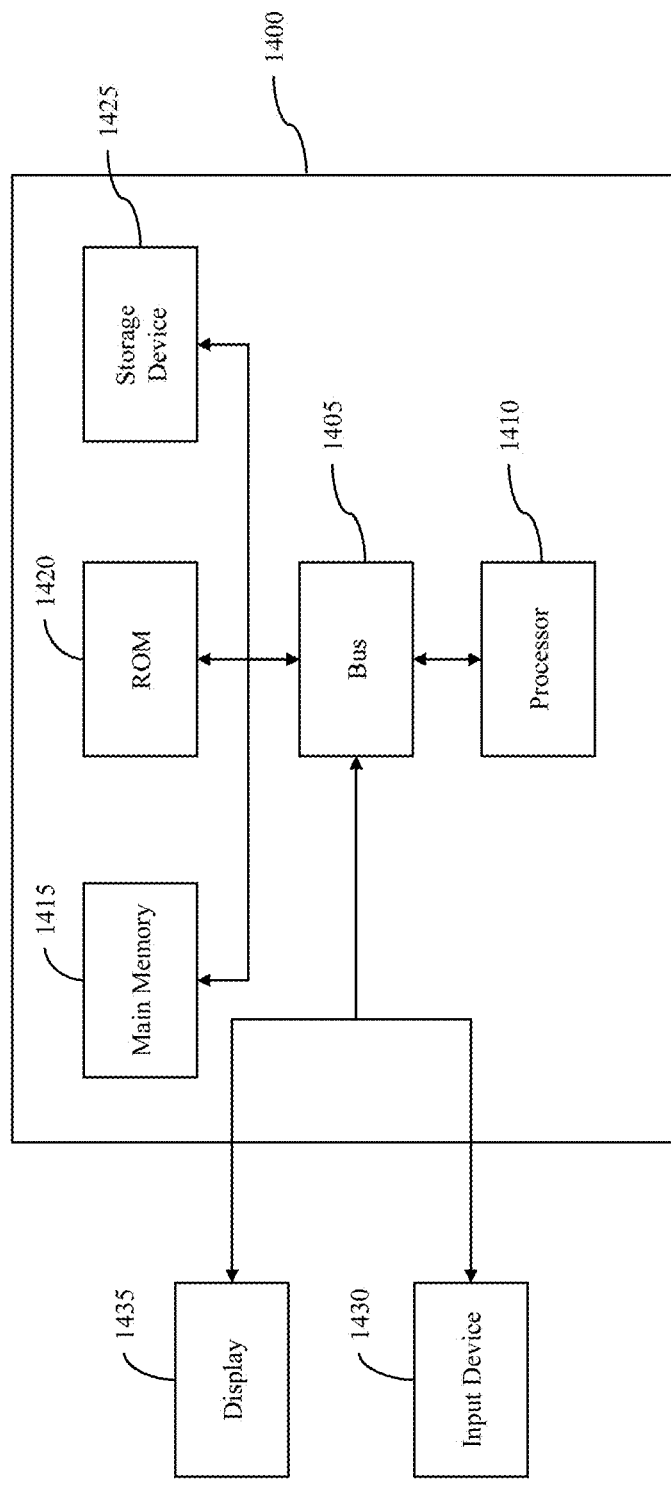
FIG. 14 is a block diagram of an example computer system, according to an example implementation of the present disclosure.

FIG. 14 depicts an example block diagram of an example computer system 1400. The computer system or computing device 1400 can include or be used to implement a data processing system or its components. The computing system 1400 includes at least one bus 1405 or other communication component for communicating information and at least one processor 1410 or processing circuit coupled to the bus 1405 for processing information. The computing system 1400 can also include one or more processors 1410 or processing circuits coupled to the bus for processing information. The computing system 1400 also includes at least one main memory 1415, such as a random access memory (RAM) or other dynamic storage device, coupled to the bus 1405 for storing information, and instructions to be executed by the processor 1410. The main memory 1415 can be used for storing information during execution of instructions by the processor 1410. The computing system 1400 may further include at least one read only memory (ROM) 1420 or other static storage device coupled to the bus 1405 for storing static information and instructions for the processor 1410. A storage device 1425, such as a solid state device, magnetic disk or optical disk, can be coupled to the bus 1405 to persistently store information and instructions.

The computing system 1400 may be coupled via the bus 1405 to a display 1435, such as a liquid crystal display, or active matrix display, for displaying information to a user. An input device 1430, such as a keyboard or voice interface may be coupled to the bus 1405 for communicating information and commands to the processor 1410. The input device 1430 can include a touch screen display 1435. The input device 1430 can also include a cursor control, such as a mouse, a trackball, or cursor direction keys, for communicating direction information and command selections to the processor 1410 and for controlling cursor movement on the display 1435.

The processes, systems and methods described herein can be implemented by the computing system 1400 in response to the processor 1410 executing an arrangement of instructions contained in main memory 1415. Such instructions can be read into main memory 1415 from another computer-readable medium, such as the storage device 1425. Execution of the arrangement of instructions contained in main memory 1415 causes the computing system 1400 to perform the illustrative processes described herein. One or more processors in a multi-processing arrangement may also be employed to execute the instructions contained in main memory 1415. Hard-wired circuitry can be used in place of or in combination with software instructions together with the systems and methods described herein. Systems and methods described herein are not limited to any specific combination of hardware circuitry and software.

Although an example computing system has been described in FIG. 14, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A method comprising:
   maintaining, by an authentication server, a plurality of authentication profiles, each authentication profile corresponding to a respective user and including at least one profile image, an immutable identifier comprising a date of birth of the respective user, and authentication data used to authenticate the respective user;
   receiving, by the authentication server from a client device of a user, via a session between the authentication server and an authentication service executing on the client device, a request including the device key of the client device, an immutable identifier for the user, and a biometric image captured during the session by a camera of the client device, the authentication service controlling the camera to capture the biometric image;
   authenticating, by the authentication server, the biometric image as captured by the camera of the client device during the session, based on a cryptographic assertion received from the client device;
   determining, by the authentication server, that the device key is a new device key generated by the authentication service;
   identifying, by the authentication server, from the plurality of authentication profiles, a subset of authentication profiles, the subset of authentication profiles comprising two or more authentication profiles, the subset having respective immutable identifiers that match the immutable identifier from the request;
   comparing, by the authentication server, one or more features extracted from the biometric image of the request to features extracted from the at least one profile image of the subset of authentication profiles; and
   linking, by the authentication server in a data structure, responsive to determining that the one or more features from the biometric image match the features extracted from the at least one profile image of the authentication profile, the new device key of the client device with an authentication profile of the subset of authentication profiles to register the client device with the authentication server.

2. The method of claim 1, wherein the request includes an image of an identification document (ID), the method further comprising:
   extracting, by the authentication server, the immutable identifier and a second image of a face of the user from the ID; and
   comparing, by the authentication server, the biometric image with the second image from the ID.

3. The method of claim 2, further comprising:
   authenticating, by the authentication server, the user based on a comparison of one or more first features extracted from the biometric image and one or more second features extracted from the second image.

4. The method of claim 1, further comprising:
determining, by the authentication server, to identify the first subset of authentication profiles based on determining that the device key does not match a known device key stored in the data structure.

5. The method of claim 1, further comprising:
identifying, by the authentication server, the authentication profile based on matching the one or more features from the biometric image to the one or more features extracted from the at least one profile image of the authentication profile; and
transmitting, by the authentication server to the client device, a second request to merge the device key for the client with the authentication profile.

6. The method of claim 5, wherein linking the device key of the client device with the authentication profile is based on a response to the second request.

7. The method of claim 1, wherein the client device comprises a second client device of the user and the biometric image is a second biometric image, the method further comprising:
receiving, by the authentication server, from a first client device of the user, a first device key of the first client device and the authentication data included in a new profile request;
receiving, by the authentication server from the first client device, a first biometric image captured by the first client of the user;
storing, by the authentication server in the data structure, the first biometric image and the first device key in association with the authentication profile.

8. The method of claim 7, wherein the second biometric image from the request is matched to the first image received from the first client device.

9. The method of claim 1, further comprising:
receiving, by the authentication server from the authentication service of the client device responsive to linking the device key to the authentication profile, a second request to authenticate the user of the client device to a resource server, the second request including a second biometric image;
authenticating, by the authentication server to the resource server, the user of the client device based on the second biometric image.

10. The method of claim 1, further comprising receiving, by the authentication server, from the authentication service, a selection to merge the new device key with the authentication profile,
wherein the authentication server links the new device key of the client device with the authentication profile responsive to determining that the one or more features from the biometric image match the features extracted from the at least one profile image of the authentication profile and according to the selection.

11. An authentication system comprising:
one or more authentication servers configured to:
maintain a plurality of authentication profiles, each authentication profile corresponding to a respective user and including at least one profile image, an immutable identifier comprising a date of birth of the respective user, and authentication data used to authenticate the respective user;
receive, from a client device of a user, via a session between the authentication server and an authentication service executing on the client device, a request including the device key of the client device, an immutable identifier of the user, and a biometric image captured during the session by a camera of the client device, the authentication service controlling the camera to capture the biometric image;
authenticate the biometric image as captured by the camera of the client device during the session, based on a cryptographic assertion received from the client device;
determine that the device key is a new device key generated by the authentication service;
identify, from the plurality of authentication profiles, a subset of authentication profiles the subset of authentication profiles comprising two or more authentication profiles, the subset having respective immutable identifiers that match the immutable identifier from the request;
compare one or more features extracted from the biometric image of the request to features extracted from the at least one profile image of the subset of authentication profiles; and
link, in a data structure, responsive to determining that the one or more features from the biometric image match the features extracted from the at least one profile image of the authentication profile, the device key of the client device with an authentication profile of the subset of authentication profiles to register the client device with the authentication server.

12. The authentication system of claim 11, wherein the request includes an image of an identification document (ID), and wherein the one or more authentication servers are configured to:
extract the immutable identifier and a second image of a face of the user from the ID; and
compare the biometric image with the second image from the ID.

13. The authentication system of claim 12, wherein the one or more authentication servers are configured to:
authenticate the user based on a comparison of one or more first features extracted from the biometric image and one or more second features extracted from the second image.

14. The authentication system of claim 11, wherein the one or more authentication servers are configured to:
determine to identify the first subset of authentication profiles based on determining that the device key does not match a known device key stored in the data structure.

15. The authentication system of claim 11, wherein the one or more authentication servers are configured to:
identify the authentication profile based on matching the one or more features from the biometric image to the one or more features extracted from the at least one profile image of the authentication profile; and
transmit, to the client device, a second request to merge the device key for the client with the authentication profile,
wherein linking the device key of the client device with the authentication profile is based on a response to the second request.

16. The authentication system of claim 11, wherein the client device comprises a second client device of the user and the biometric image is a second biometric image, and wherein the one or more authentication servers are configured to:
receive, from a first instance of the authentication service executing on first client device of the user, a first device key of the first client device and the authentication data included in a new profile request;

receive, from the first client device, a first biometric image captured using a camera of the first client device controlled via the authentication service;

store, in the data structure, the first biometric image and the first device key in association with the authentication profile.

17. The authentication system of claim 16, wherein the second biometric image from the request is matched to the first image received from the first client device.

18. The authentication system of claim 11, wherein the request is a request to authenticate to a resource server, and wherein the one or more authentication servers are configured to:

authenticate, to the resource server, the user of the client device based on the first biometric image and a second image extracted from an identification document captured by the client device.

19. The authentication system of claim 11, wherein the one or more authentication servers are configured to receive, from the authentication service, a selection to merge the new device key with the authentication profile, wherein the authentication server links the new device key of the client device with the authentication profile responsive to determining that the one or more features from the biometric image match the features extracted from the at least one profile image of the authentication profile and according to the selection.

20. A non-transitory computer readable medium storing instructions that, when executed by one or more processors of an authentication server, cause the one or more processors to:

maintain a plurality of authentication profiles, each authentication profile corresponding to a respective user and including at least one profile image, an immutable identifier comprising a date of birth of the respective user, and authentication data used to authenticate the respective user;

receive, from a client device of a user, via a session between the authentication server and an authentication service executing on the client device, a request including the device key of the client device, an immutable identifier of the user, and a biometric image captured during the session by a camera of the client device, the authentication service controlling the camera to capture the biometric image;

authenticate the biometric image as captured by the camera of the client device during the session, based on a cryptographic assertion received from the client device;

determine that the device key is a new device key generated by the authentication service;

identify, from the plurality of authentication profiles, a subset of authentication profiles the subset of authentication profiles comprising two or more authentication profiles, the subset having respective immutable identifiers that match the immutable identifier from the request; compare one or more features extracted from the biometric image of the request to features extracted from the at least one profile image of the subset of authentication profiles; and link, in a data structure, responsive to determining that the one or more features from the biometric image match the features extracted from the at least one profile image of the authentication profile, the device key of the client device with an authentication profile of the subset of authentication profiles to register the client device with the authentication server.

* * * * *